(12) United States Patent
Zhu

(10) Patent No.: US 12,454,957 B2
(45) Date of Patent: *Oct. 28, 2025

(54) NECK FAN

(71) Applicant: Guangdong Aoyun Technology Co., Ltd., Guangdong (CN)

(72) Inventor: Xueping Zhu, Guangdong (CN)

(73) Assignee: Guangdong Aoyun Technology Co., Ltd., Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/016,175

(22) Filed: Jan. 10, 2025

(65) Prior Publication Data

US 2025/0237226 A1    Jul. 24, 2025

Related U.S. Application Data

(63) Continuation-in-part of application No. 18/933,625, filed on Oct. 31, 2024, and a continuation-in-part of application No. 18/421,213, filed on Jan. 24, 2024, now abandoned.

(51) Int. Cl.
| | |
|---|---|
| *F04D 25/16* | (2006.01) |
| *F04D 25/06* | (2006.01) |
| *F04D 27/00* | (2006.01) |
| *F04D 29/42* | (2006.01) |

(52) U.S. Cl.
CPC ....... *F04D 25/166* (2013.01); *F04D 25/0673* (2013.01); *F04D 27/00* (2013.01); *F04D 29/4226* (2013.01)

(58) Field of Classification Search
CPC ................ H02J 7/0032; H02P 2201/07; H02P 2201/09; H02K 5/22; F04D 19/002; F04D 25/0606; F04D 25/0673; F04D 25/084; F04D 27/004; F04D 29/23; F04D 29/441
See application file for complete search history.

(56) References Cited

U.S. PATENT DOCUMENTS

| | | | |
|---|---|---|---|
| 2010/0164421 A1* | 7/2010 | Dishman | F04D 27/004 318/471 |
| 2017/0302093 A1* | 10/2017 | Petersen | H02M 3/158 |
| 2017/0370596 A1* | 12/2017 | Lee | A42B 3/286 |
| 2019/0222038 A1* | 7/2019 | Chen | H01M 10/0525 |
| 2021/0190344 A1* | 6/2021 | Pille | F24F 8/10 |
| 2023/0006512 A1* | 1/2023 | Ji | H02K 9/06 |
| 2024/0229809 A1* | 7/2024 | Zheng | F04D 29/547 |

* cited by examiner

*Primary Examiner* — Kenneth J Hansen
(74) *Attorney, Agent, or Firm* — Zhigang Ma

(57) ABSTRACT

A neck fan includes a first fan main body and a second fan main body. The second fan main body connected to the first fan main body. The first fan main body and the second fan main body are configured to blow air towards a user respectively, the first fan main body and the second fan main body are respectively provided with a control switch, and the control switch is configured to control an operation of the first fan main body and/or the second fan main body.

19 Claims, 24 Drawing Sheets

NECK FAN

CROSS-REFERENCE TO RELATED APPLICATIONS

This application is a Continuation-in-Part of the U.S. application Ser. No. 18/933,625 filed on Oct. 31, 2024, and entitled "NECK FAN", which is a Continuation-in-Part of the U.S. application Ser. No. 18/421,213 filed on Jan. 24, 2024, and entitled "NECK FAN," now pending, the entire disclosures of which are incorporated herein by reference.

TECHNICAL FIELD

The present invention relates to the field of fans, and in particular, to a neck fan.

BACKGROUND

As portable cooling equipment, a fan main body has received widespread attentions and been widely applied in hot seasons in recent years, especially a neck fan. The neck fan can be carried around and free the hands, and are favored by the majority of users.

However, as people continue to pursue comfortable experiences, they have gradually increasing expectations for the performance of the neck fan. In the scorching summer, users hope to achieve a faster and more direct cooling effect in a high-temperature environment, but the design of the traditional neck fan fails to fully meet this demand.

For this purpose, the present invention provides a neck fan that allows air from the fan to be blown more directly and centrally towards a user, thereby providing a more comfortable user experience in a hot environment. According to this design, the cooling effect of the neck fan is improved while the portability is achieved, so that the growing demand of the user for personalized and efficient cooling equipment is met.

SUMMARY

In order to overcome the shortcomings of the prior art, the present invention provides a neck fan.

The present invention provides a neck fan, which includes a first fan main body and a second fan main body.

The second fan main body connected to the first fan main body.

The first fan main body and the second fan main body are configured to blow air towards a user respectively, the first fan main body and the second fan main body are respectively provided with a control switch, and the control switch is configured to control an operation of the first fan main body and/or the second fan main body.

In one embodiment, the second fan main body and the first fan main body are oppositely arranged and are respectively positioned on two sides of the user's neck; and the second fan main body and the first fan main body have the same structure.

In one embodiment, the first fan main body includes a first main body portion, a first fan assembly, a first power supply assembly and a first switch, the first main body portion is provided with a first mounting cavity, the first power supply assembly is arranged within the first mounting cavity and is electrically connected to the first fan assembly, the first power supply assembly includes a first battery and a first circuit board, the first switch and the first battery are electrically connected to the first circuit board, the first circuit board is provided with a first main control module, the first switch is mounted on the first main body portion and is electrically connected to the first main control module, and the first switch is configured to turn on or turn off the first fan assembly.

In one embodiment, the first fan main body further includes a first charging interface and a first charging control module, and the first charging interface and the first charging control module are configured to charge the first battery; the first fan main body further includes a first status indication module, and the first status indication module is configured to display at least one of a startup status, a shutdown status, a charging status, and an output wind level of the first fan main body or the neck fan.

In one embodiment, the first fan main body further includes a first battery protection module, the first battery protection module is electrically connected to the first main control module and the first charging control module, and is configured to perform charging protection for the first battery.

In one embodiment, the first switch includes a stepless adjustment key configured to perform stepless adjustment and control the rotation speed of the first fan main body; and the stepless adjustment key is a potentiometer with variable electric resistance or an encoder.

In one embodiment, the stepless adjustment key includes a plurality of connection terminals and at least one adjustment pin, one of the plurality of connection terminals is grounded, and at least one adjustment pin is configured for the user to operate so that the other connection terminals output corresponding stepless adjustment signals.

In one embodiment, the first fan main body further includes a first boost module; the first switch is configured to send out a first fan working signal; the first main control module, when receiving the first fan working signal, is configured to drive the first boost module to receive and boost the output voltage of the first battery, thereby driving the first fan assembly to operate; and the first main control module is also configured to control the output voltage of the first boost module to achieve control over the rotation speed of the first fan assembly.

In one embodiment, the first boost module includes an inductor and a switching element, a control terminal of a MCU of the first main control module is connected to a control terminal of the switching element, a first conducting terminal of the switching element is connected to the first battery via the inductor, a second conducting terminal of the switching element is grounded, the first conducting terminal of the switching element is connected to the first fan assembly, the MCU of the first main control module controls the on-off state of the switching element, thereby controlling the voltage from the first battery to be boosted through the inductor, and provides the boosted voltage to the first fan assembly to drive the first fan assembly to blow air.

In one embodiment, the second fan main body further includes a second main body portion, a second fan assembly, a second power supply assembly and a second switch, the second power supply assembly includes a second battery and a second circuit board, the second switch and the second battery are electrically connected to the second circuit board, the second circuit board is provided with a second main control module, the second switch is mounted on the second main body portion and is electrically connected to the second main control module, the second switch is configured to turn on or turn off the second fan main body, the second fan main body further includes a second boost module, the second switch is configured to send out a second fan working signal, the second main control module, when receiving the second fan working signal, is configured to drive the second boost module to receive and boost the output voltage of the second battery, thereby driving the second fan assembly to operate, and the second main control module is also configured to control the output voltage of the second boost module to achieve control over the rotation speed of the second fan assembly.

In one embodiment, the first main body portion is provided with a first conductive end, the second main body portion is provided with a second conductive end, when the first fan main body and the second fan main body are connected together, consequently, the first conductive end is communicated with the second conductive end, the first switch is electrically connected to the first main control module and the second main control module respectively, and the second switch is also electrically connected to the first main control module and the second main control module respectively, such that at least one of the first switch and the second switch can send out a third fan working signal; the first main control module is configured to receive the third fan working signal and drive the first boost module to boost the output voltage of the first battery, thereby driving the first fan assembly to operate, and the second main control module is configured to receive the third fan working signal and drive the second boost module to boost the output voltage of the second battery, thereby driving the second fan assembly to operate.

In one embodiment, the first fan main body and the second fan main body are manufactured independently and then connected together through an assembly process.

In one embodiment, the first fan main body and the second fan main body are detachably connected, so that the first fan main body and the second fan main body are able to operate and be used independently.

In one embodiment, the neck fan further includes a connection member, the connection member includes a flexible connection portion, the flexible connection portion is provided with at least one installation hole, the at least one installation hole is configured to be sleeved and fixed on one end of the first fan main body and one end of the second fan main body, so that the first fan main body and the second fan main body are connected through the flexible connection portion.

In one embodiment, an inner sidewall of the at least one installation hole is provided with a first anti-detachment structure and a second anti-detachment structure, the first anti-detachment structure is configured to engage with a first buckle on an outer surface of one end of the first fan main body, the second anti-detachment structure is configured to engage with a second buckle on one end of the second fan main body, and at least one of the first anti-detachment structure and the first buckle is provided with a plurality of concave-convex structures arranged in sequence along an extending direction of the connection member.

In one embodiment, the first anti-detachment structure includes a plurality of first buckle slots arranged along an extending direction of the connection member, the plurality of first buckle slots are configured to engage with a plurality of protrusions arranged along an extending direction of the first buckle; the second anti-detachment structure includes a plurality of second buckle slots arranged along the extending direction, the plurality of second buckle slots are configured to engage with a plurality of protrusions arranged along an extending direction of the second buckle; the first anti-detachment structure is configured to be detachably connected with the first buckle, and the second anti-detachment structure is configured to be detachably connected with the second buckle; the flexible connection portion is also provided with a first fixing structure and a second fixing structure, the first fixing structure and the second fixing structure are respectively arranged at two ends of the flexible connection portion, the first fixing structure is configured to connect with a third fixing structure at one end of the first fan main body, and the second fixing structure is configured to connect with a fourth fixing structure at one end of the second fan main body; the first fixing structure is configured to be detachably connected with the third fixing structure, and the second fixing structure is configured to be detachably connected with the fourth fixing structure.

In one embodiment, the connection member further includes at least one neck support portion, the at least one neck support portion is connected to an inner side of the flexible connection portion adjacent to the human neck, the at least one neck support portion is configured to form at least one air inlet gap with the first fan main body or the second fan main body, so that air from the first fan main body or the second fan main body can enter the air inlet gap.

In one embodiment, the first fan main body includes a first main body portion, the first main body portion has an arc-shaped structure, and includes a concave first air guide path positioned on a surface of one side of the first main body portion and extended along an extending direction of the arc-shaped structure; the first fan assembly is arranged at one end of the first main body portion and is configured to blow air towards the first air guide path, and the first air guide path is configured to guide air of the first fan assembly to one side of the first main body portion and one end of the first main body portion away from the first fan assembly.

In one embodiment, the first fan assembly includes a first fan shell, a first motor, and a first fan blade mounted on a rotating shaft of the first motor, the first motor and the first fan blade are arranged within the first fan shell; the first fan shell includes a shell main body and an air outlet hood, the air outlet hood is arranged on one side of the shell main body; the air outlet hood includes a plurality of air gathering rings and an annular wall structure connected to a periphery of the plurality of air gathering rings, a plurality of air outlet holes are formed among the plurality of air gathering rings, and the air gathering rings are configured to cooperate with an inner side surface of the annular wall structure to pressurize wind from the shell main body and then blow it out.

In one embodiment, the inner side surface of the annular wall structure is an inclined surface or an arc-shaped surface, so that an inner diameter of the annular wall structure gradually decreases along a direction from the shell main body to the air outlet hood; the shell main body includes an annularly arranged sidewall structure, an mounting portion positioned at one end inside the sidewall structure and an air guiding portion connected between the mounting portion and the sidewall structure, the air guiding portion includes a plurality of air guiding blades arranged at intervals and is configured to guide wind from the first fan blade based on a preset direction, the first fan blade and the first motor are arranged within the sidewall structure and are positioned on one side of the mounting portion, and the first motor is mounted on the mounting portion; the first fan shell further includes a metal barrier net, the metal barrier net is arranged on one side of the sidewall structure away from the air outlet hood, the metal barrier net is made of metal material and is provided with a plurality of air inlet holes, and an inner diameter of each air inlet holes ranges from 0.5 mm to 4 mm; the air inlet hole is in a regular hexagon shape, a surrounding wall is arranged between two adjacent air inlet holes, and a width of the surrounding wall ranges from 0.05 mm to 2 mm.

The beneficial effects of the present invention are as follows: the present invention provides a neck fan, which includes two fan main bodies, and each fan main body is provided with a control switch, facilitating the user to control the neck fan and improving the user experience. In addition, the two fan main bodies can also form a modular design, which not only facilitates assembly but also reduces the costs of assembly and maintenance. Moreover, users can also detach, assemble, store by themselves and conduct DIY designs and so on, thereby improving the user experience.

BRIEF DESCRIPTION OF THE DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

Embodiment I

Figure 1:
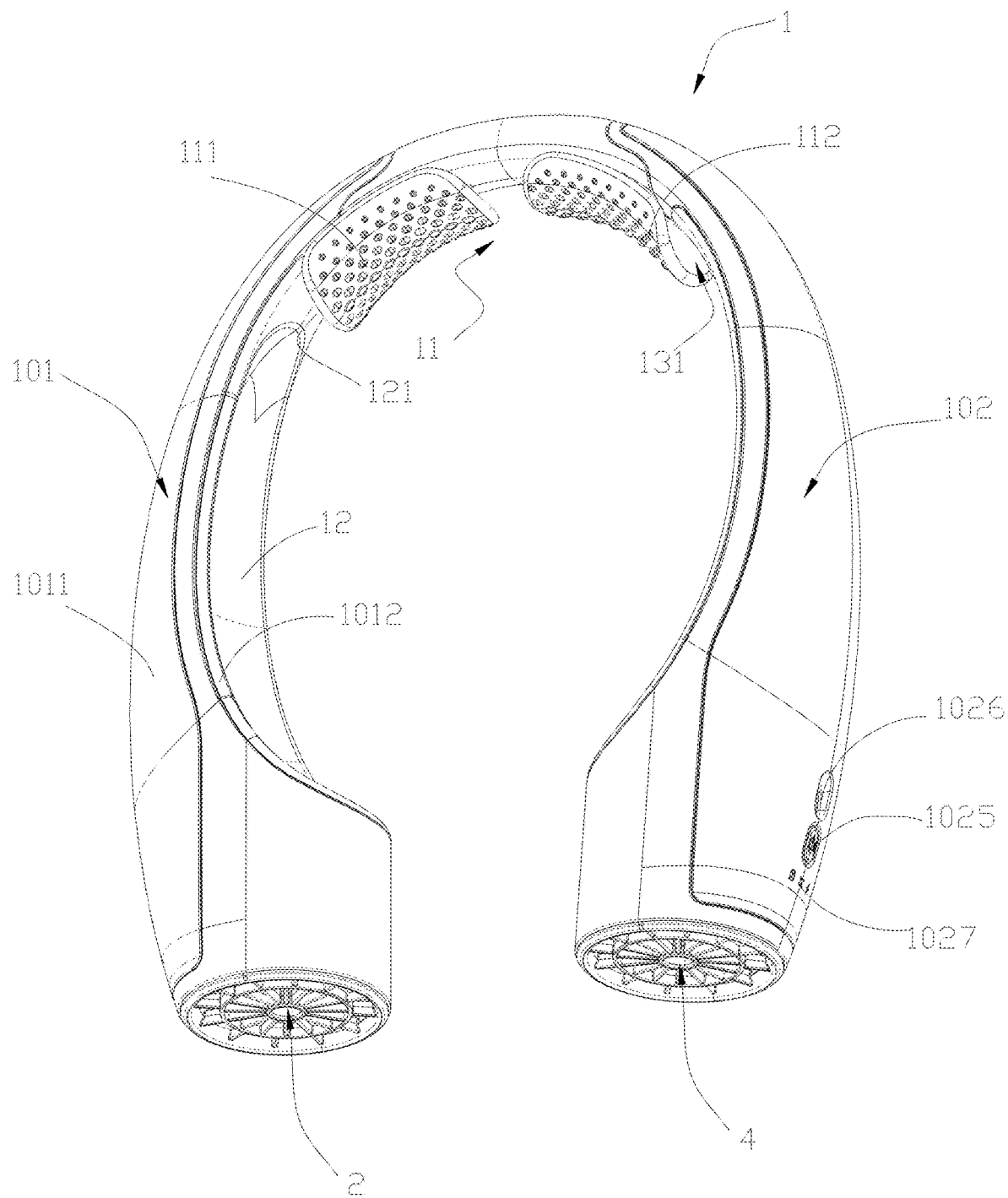
FIG. 1 is a schematic diagram of an entire structure of a neck fan according to Embodiment I of the present invention.
Figure 2:
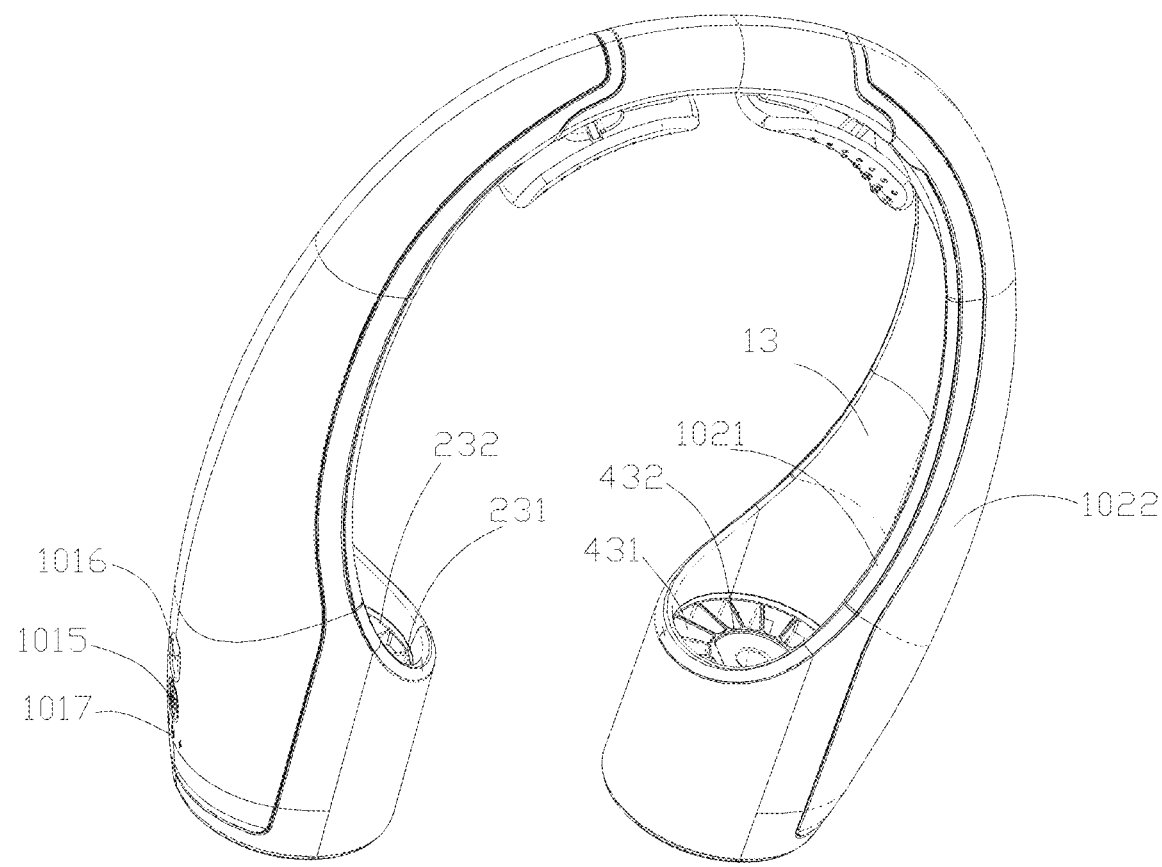
FIG. 2 is a schematic diagram of an entire structure of another viewing angle of the neck fan according to Embodiment I of the present invention.
Figure 3:
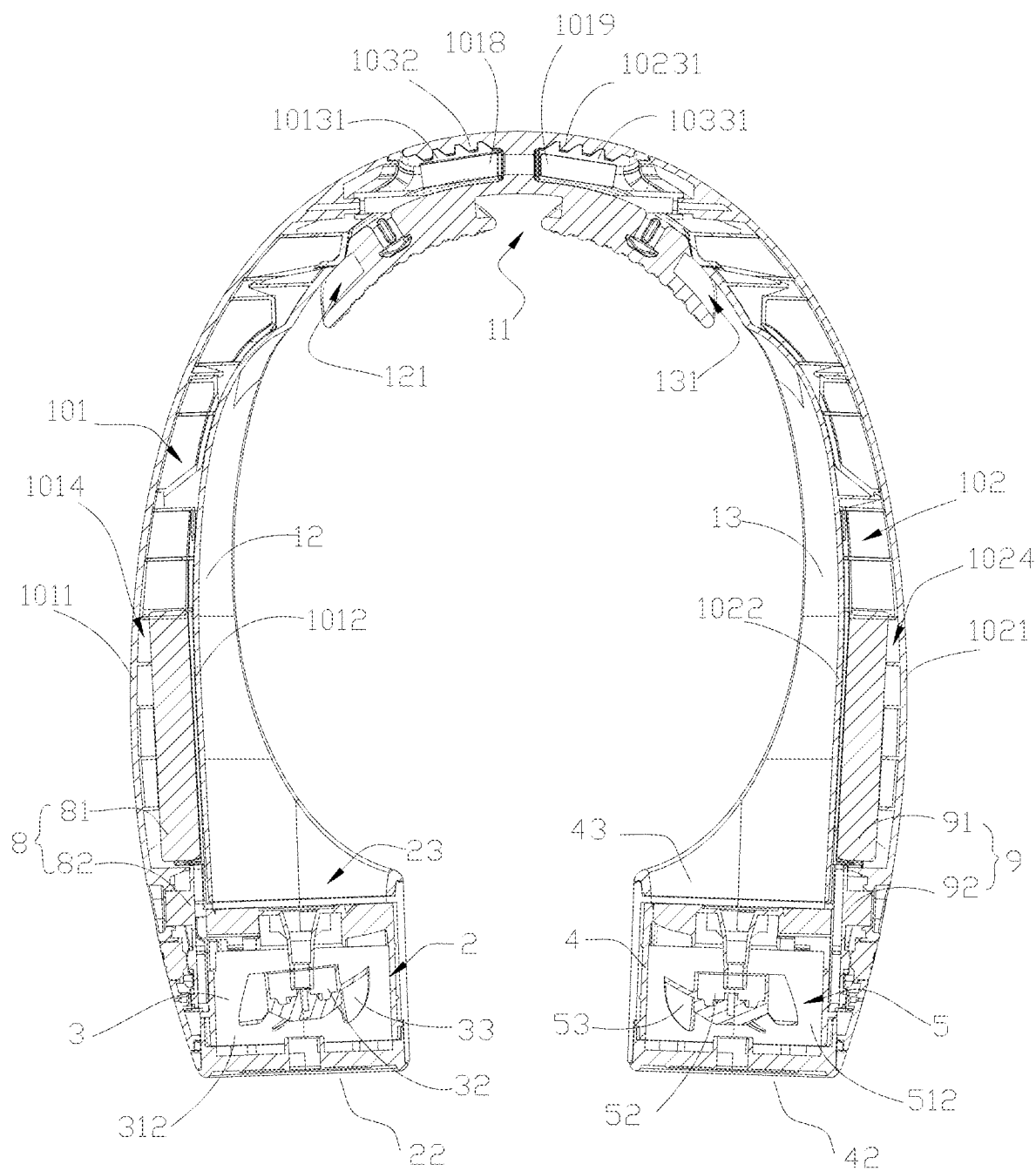
FIG. 3 is a sectional view of the neck fan according to Embodiment I of the present invention.
Figure 4:
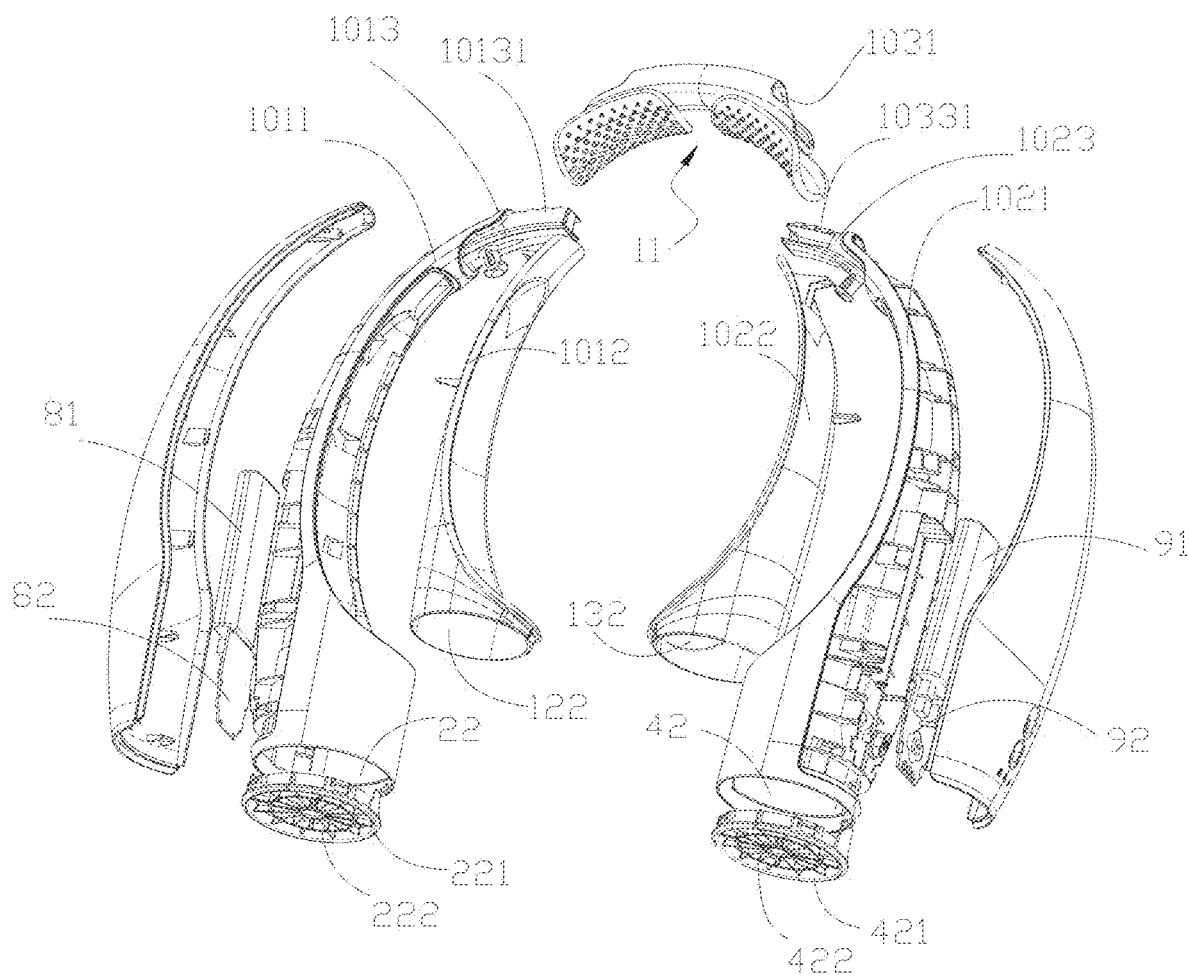
FIG. 4 is an exploded view of the neck fan according to Embodiment I of the present invention.
Figure 5:
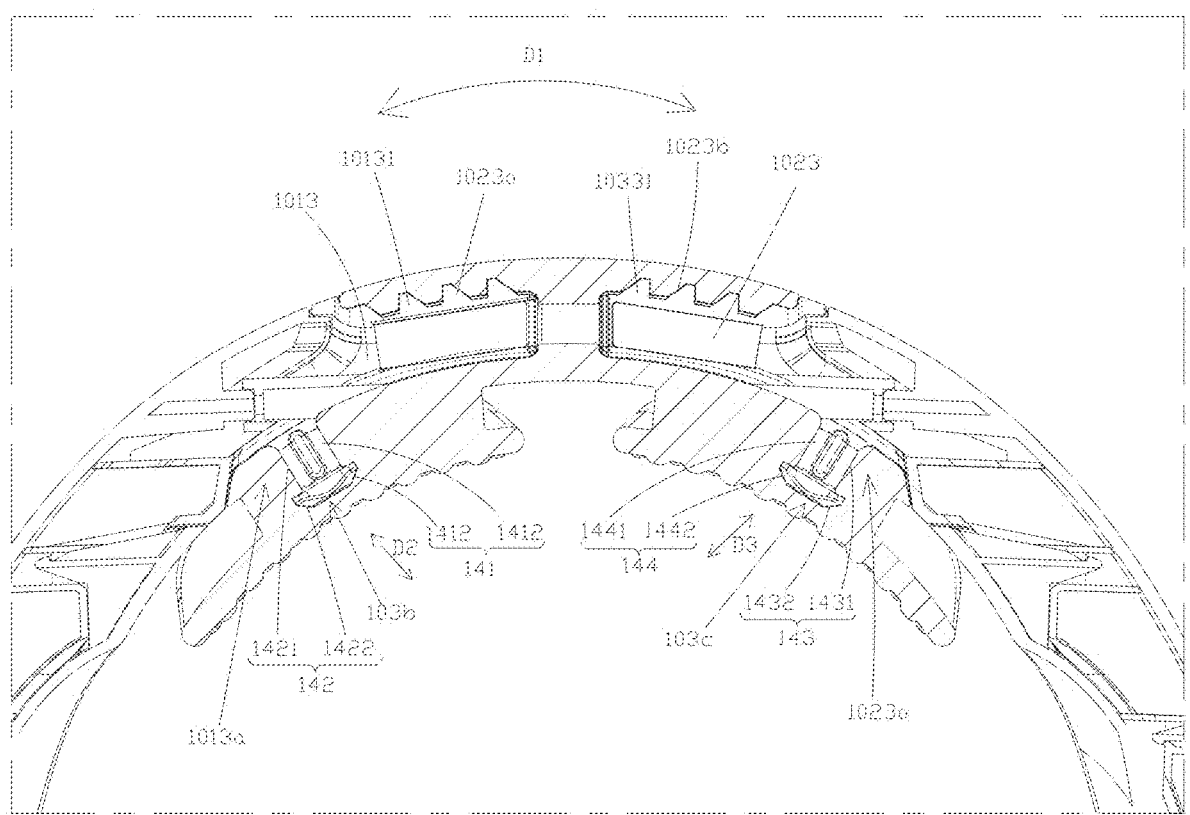
FIG. 5 is a partial enlarged structural diagram of a portion V of FIG. 3.
Figure 6:
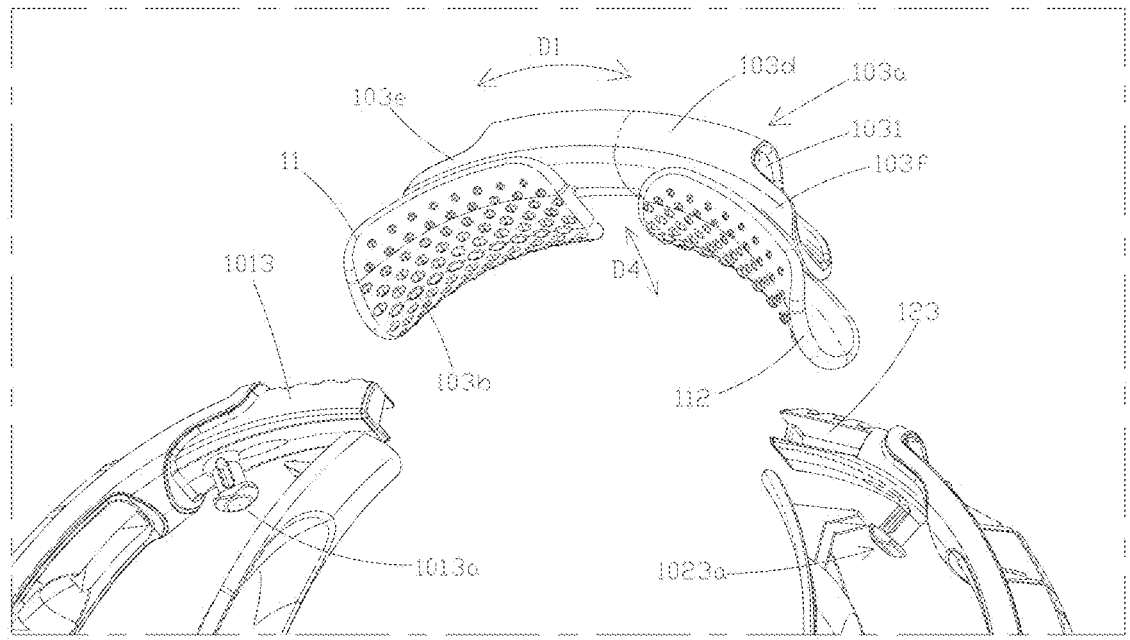
FIG. 6 is a partial enlarged structural diagram of a portion VI of FIG. 4.
Figure 7:
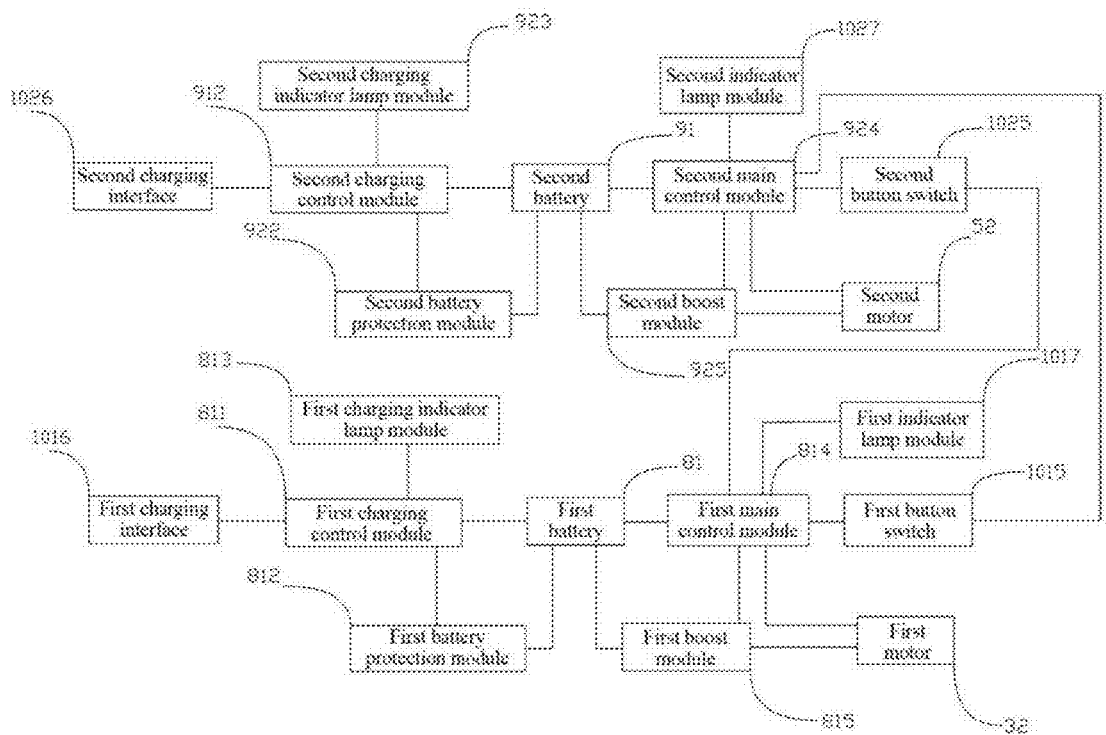
FIG. 7 is a schematic block diagram of the neck fan according to Embodiment I of the present invention.
Figure 8:
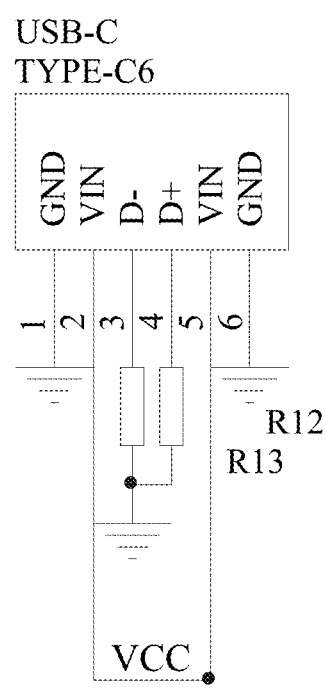
FIG. 8 is a circuit diagram of a first charging interface of the neck fan of the present invention.
Figure 9:
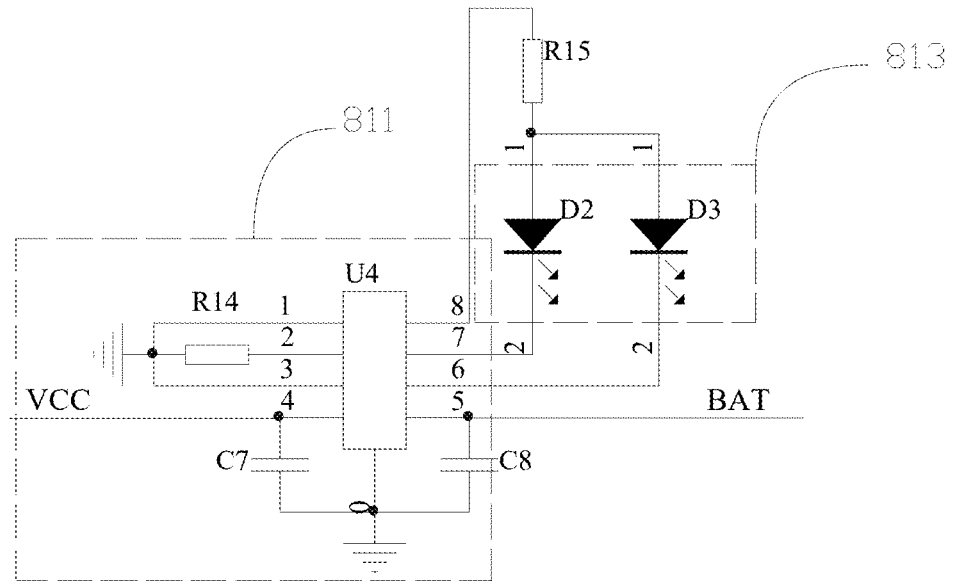
FIG. 9 is a circuit diagram of a first charging control module of the neck fan of the present invention.
Figure 10:
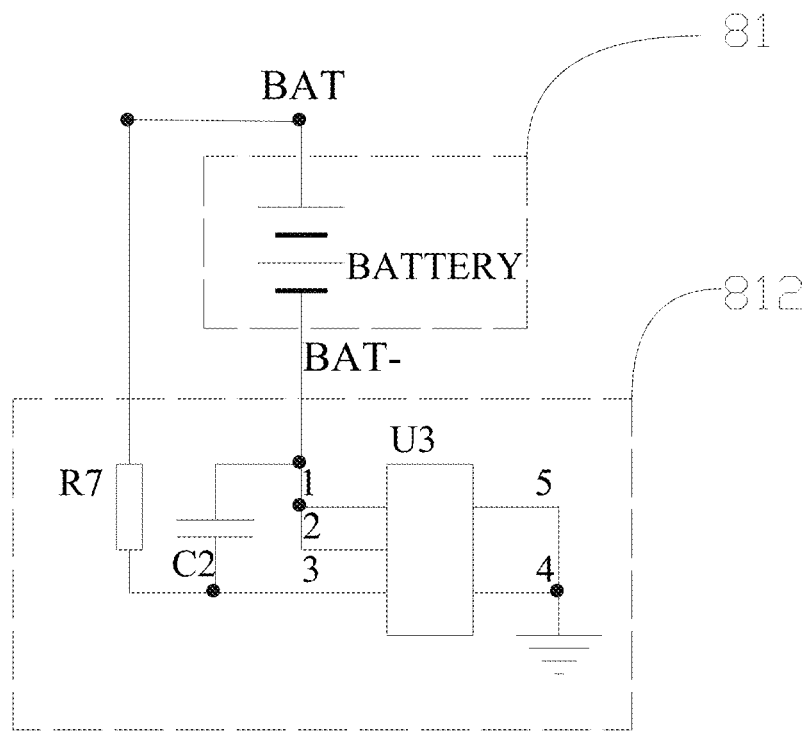
FIG. 10 is a circuit diagram of a first battery of the neck fan of the present invention.

Referring to FIG. 1 to FIG. 13, a neck fan includes a hanging main body land a first fan assembly 3. A straight-tube-shaped first air guide chamber 2 is arranged at a lower end portion of the hanging main body 1 in a protruding manner; the first air guide chamber 2 includes a first air inlet 22 arranged at the lower end portion of the hanging main body 1 and a first air outlet 23 opposite to the first air inlet 22; the hanging main body 1 includes an inner end portion 11 that is in contact with the neck of a user; the first air outlet 23 faces the inner end portion 11; the first fan assembly 3 is located in the first air guide chamber 2; and the first fan assembly 3 is configured to drive an air flow to flow from the first air inlet 22 to the inner end portion 11 via the first air outlet 23. Through the above structure, due to the straight-tube shape of the first air guide chamber 2, the neck fan forms a vertical blowing type fan capable of blowing air in a vertical direction. The first fan assembly 3 can drive the air flow to be blown from the first air inlet 22 to the inner end portion 11 through the first air outlet 23, greatly improving the air blowing efficiency. A user can directly feel the cool air blown directly to the neck when using the neck fan. This improves the overall performance of the fan. Furthermore, since the first air guide chamber 2 is a straight-tube-shaped cavity integrally protruding out of the hanging main body 1, this design improves the overall sense of beauty and sense of design of the product, helps to improve the wearing comfort of the neck fan, and improves the overall quality and user experience of the product.

In this embodiment, a hanging main body 1 is U-shaped, the hanging main body 1 includes a first main body portion 101, a second main body portion 102 and a connection member 103. The first main body portion 101 and the second main body portion 102 are detachably connected through the connection member 103. Furthermore, the connection member 103, which is flexible, can be a silica gel connection member, a plastic connection member or a rubber connection member. Moreover, the first fan assembly 3 is arranged on the first main body portion 101.

In this embodiment, the neck fan (such as the first main body portion 101) is provided with a first air guide path 12 that is inwards sunken; the first air guide path 12 extends from the first air outlet 23 to the inner end portion 11; and the first fan assembly 3 drives the air flow to be blown out from the first air outlet 23 towards the inner end portion 11 along the first air guide path 12. Further, a flexible first neck support 111 is connected to the inner end portion 11; a first air inlet gap 121 is formed between the first neck support 111 and the inner end portion 11; the first fan assembly 3 drives the air flow to be blown out from the first air outlet 23 towards the first air inlet gap 121 along the first air guide path 12. The first neck support 111 can be a silica gel neck support, a plastic neck support, a rubber neck support, or the like. Through the above structure, when the air flow is blown out from the first air outlet 23, under the guidance of the first air guide path 12 that is inwards sunken, the air flow will be blown towards the inner end portion 11 along the first air guide path 12. Due to the first air inlet gap 121, the air flow can be blocked in the gap, so that when a user wears the neck fan, the user can have a stronger feeling about the air flow at the inner end portion 11, and the heat dissipation effect is enhanced; and furthermore, the flexible neck support provides a more comfortable supporting effect for the user, which improves the user experience.

In this embodiment, a width of the first air guide path gradually decreases towards the inner end portion along the first air outlet; a width range of the first air guide path is 1 to 5 cm; a length range of the first air guide path is 8 to 16 cm; and a depth range of the first air guide path is 0 to 3 cm.

In this embodiment, the first main body portion 101 a first outer shell 1011 and a first inner shell 1012; the first air guide path 12 is arranged on the first inner shell 1012; and the first inner shell 1012 is detachably connected to the first outer shell 1011 through a buckle. It is convenient for a user to open and mount the first main body portion 101 for maintenance.

In this embodiment, a diameter of the first air inlet 22 is within a range of 30 mm to 60 mm, and a diameter of the first air outlet 23 is within a range of 30 mm to 60 mm. Through the above structure, an appropriate diameter range helps to achieve a balanced air flowrate, so that the fan can provide a sufficient air flow and maintain a good cooling effect. Furthermore, it helps to rationalize the overall structure, and the neck fan is convenient to carry and use.

In this embodiment, a straight-tube-shaped second air guide chamber 4 is further arranged at a lower end portion of the neck fan in a protruding manner; the second air guide chamber 4 includes a second air inlet 42 arranged at the lower end portion of the hanging main body 1 and a second air outlet 43 opposite to the second air inlet 42; the second air outlet 43 faces the inner end portion 11; the neck fan further includes a second fan assembly 5. The second fan assembly 5 is arranged in the second air guide chamber 4; and the second fan assembly 5 is configured to drive the air flow to be blown out from the second air inlet 42 towards the inner end portion 11 via the second air outlet 43. Through the above structure, due to the straight-tube shape of the second air guide chamber 4, the neck fan forms a vertical blowing type fan capable of blowing air in a vertical direction, so that the second fan assembly 5 can drive the air flow to be blown from the second air inlet 42 to the inner end portion 11 through the second air outlet 43, greatly improving the air blowing efficiency. A user can directly feel the cool air when using the neck fan. This improves the overall performance of the fan. Furthermore, since the second air guide chamber 4 is a straight-tube-shaped cavity integrally protruding out of the hanging main body 1, this design improves the overall sense of beauty and sense of design of the product, helps to improve the wearing comfort of the neck fan, and improves the overall quality and user experience of the product. It can be understood that the second fan assembly 5 is arranged in the second main body portion 102.

In this embodiment, the neck fan (such as the second main body portion 102) is provided with a second air guide path 13 that is inwards sunken; the second air guide path 13 extends from the second air outlet 43 to the inner end portion 11; and the second fan assembly 5 drives the air flow to be blown out from the second air outlet 43 towards the inner end portion 11 along the second air guide path 13. Further, a flexible second neck support 112 is connected to the inner end portion 11; a second air inlet gap 131 is formed between the second neck support 112 and the inner end portion 11; the second fan assembly 5 drives the air flow to be blown out from the second air outlet 43 towards the second air inlet gap 131 along the second air guide path 13. The second neck support 112 can be a silica gel neck support, a plastic neck support, a rubber neck support, or the like. Through the above structure, when the air flow is blown out from the second air outlet 43, under the guidance of the second air guide path 13 that is inwards sunken, the air flow will be blown towards the inner end portion 11 along the second air guide path 13. Due to the second air inlet gap 131, the air flow can be blocked in the gap, so that when a user wears the neck fan, the user can have a stronger feeling about the air flow at the inner end portion 11 more strongly, and the heat dissipation effect is enhanced; and furthermore, the flexible neck support provides a more comfortable supporting effect for the user, which improves the user experience.

In this embodiment, the second main body portion 102 includes a second outer shell 1021 and a second inner shell 1022; the second air guide path 13 is arranged on the second inner shell 1022; and the second inner shell 1022 is detachably connected to the second outer shell 1021 through a buckle. It is convenient for a user to open and mount the second main body portion 102 for maintenance. In particular, the first air guide path 12 includes a first air blowing opening 122 aligned with the first air outlet 23, and the second air guide path 13 includes a second air blowing opening 132 aligned with the second air outlet 43.

In this embodiment, the neck fan further includes a first power supply assembly 8; the first power supply assembly 8 is located inside the hanging main body 1; the first power supply assembly 8 is electrically connected to the first fan assembly 3 to supply power to the first fan assembly 3; the first power supply assembly 8 includes a first battery 81 and a first circuit board 82; and the first battery 81 is electrically connected to the first circuit board 82 to supply power to the first circuit board 82. The neck fan further includes a second power supply assembly 9; the second power supply assembly 9 is located inside the hanging main body 1; the second power supply assembly 9 is electrically connected to the second fan assembly 5 to provide power to the second fan assembly 5; the second power supply assembly 9 includes a second battery 91 and a second circuit board 92; and the second battery 91 is electrically connected to the second circuit board 92 to supply power to the second circuit board 92. Through the above structure, the first power supply assembly 8 is arranged inside the hanging main body 1. This design can improve the overall appearance of the neck fan and effectively supply power to the first fan assembly 3, to ensure the reliability of the product. The second power supply assembly 9 is arranged inside the hanging main body 1. This design can improve the overall appearance of the neck fan and effectively supply power to the second fan assembly 5, to ensure the reliability of the product.

In this embodiment, the first fan assembly 3 includes a first fan shell 31, a first motor 32 fixedly mounted inside the first fan shell 31, and a first fan blade 33 mounted on a rotating shaft of the first motor 32; the first fan shell 31 is provided with a third air inlet 311, a first air duct 312, and a third air outlet 313; and the first air inlet 22, the third air inlet 311, the first air duct 312, the third air outlet 313, the first air guide chamber 2, and the first air outlet 23 are connected to each other in sequence. Through the above structural design, the first fan assembly 3 in this embodiment is provided with the independent outer shell, which facilitates independent mounting and replacement of the fan.

In another implementation, the first fan assembly 3 includes a first motor 32 and a first fan blade 33 mounted on a rotating shaft of the first motor 32; the first air inlet 22 is connected with a first air inlet hood 221; the first air inlet hood 221 is provided with several first air inlet holes 222; the first air outlet 23 is connected to a first air outlet hood 231; and the first air outlet hood 231 is provided with several first air outlet holes 232. Through the above structure, the design of a fan shell is omitted in this case, which saves the cost. Furthermore, a direction of the air flow is effectively achieved. The design of the first air inlet hood 221 and the first air outlet hood 231 is conducive to preventing other debris, such as hairs and paper scraps, from being sucked into the fan, which is conducive to maintaining the safety of the fan.

In this embodiment, the second fan assembly 5 includes a second fan shell 51, a second motor 52 fixedly mounted inside the second fan shell 51, and a second fan blade 53 mounted on a rotating shaft of the second motor 52; the second fan shell 51 is provided with a fourth air inlet 511, a second air duct 512, and a fourth air outlet 513; and the second air inlet 42, the fourth air inlet 511, the second air duct 512, the fourth air outlet 513, the second air guide chamber 4, and the first air outlet 23 are connected to each other in sequence. Through the above structural design, the first fan assembly 3 in this embodiment is provided with the independent outer shell, which facilitates independent mounting and replacement of the fan.

In some other embodiments, the second fan assembly 5 includes a second motor 52 and a second fan blade 53 mounted on a rotating shaft of the second motor 52; the second air inlet 42 and a fourth air inlet 511 are connected with a second air inlet hood 421; the second air inlet hood 421 is provided with several second air inlet holes 422; the second air outlet 43 and a fourth air outlet 513 are connected with a second air outlet hood 431; and the second air outlet hood 431 is provided with several second air outlet holes 432. Through the above structure, the design of a fan shell is omitted in this case, which saves the cost. Furthermore, a direction of the air flow is effectively achieved. The design of the second air inlet hood 421 and the second air outlet hood 431 is conducive to preventing other debris, such as hairs and paper scraps, from being sucked into the fan, which is conducive to maintaining the safety of the fan.

In this embodiment, the connector 103 is provided with a installation hole 1031; the first main body portion 101 is provided with a first connection end 1013 connected to the connector 103; the first connection end 1013 is detachably inserted into one end of the installation hole 1031; the second main body portion 102 is provided with a second connection end 1023 connected to the connector 103; and the second connection end 1023 is detachably inserted into the other end of the installation hole 1031.

Further, a concave-convex first buckle 10131 is arranged at the first connection end 1013; the connector 103 is provided with a first buckle slot 1032 that cooperates with the first buckle 10131; a concave-convex second buckle 10331 is arranged at the second connection end 1023; and the connector 103 is provided with a second buckle slot 10231 that cooperates with the second buckle 10331. Through the above structure, the connector 103 is a flexible silica gel connector. After the connector 103 is bent to an angle, the first main body portion 101 and the second main body portion 102 can be easily inserted into the installation hole 1031. The first main body portion 101 is in clamping fit with the first buckle slot 1032 on an inner wall of the connector 103 through the concave-convex first buckle 10131 arranged at the first connection end 1013, and the second main body portion 102 is in clamping fit with the second buckle slot 10231 on the inner wall of the connector 103 through the concave-convex second buckle 10331 arranged at the second connection end 1023, so that it is convenient to mount and connect the first main body portion 101 to the second main body portion 102 to form a complete neck fan.

Referring to FIG. 3 to FIG. 6, the connection member 103 can be divided into a flexible connection portion 103a, and the flexible connection portion 103a can be provided with at least one installation hole 1031. The at least one installation hole 1031 is configured to extend along an extending direction D1 from the first connection end 1013 of the first main body portion 101 to the second connection end 1023 of the second main body portion 102, and the at least one installation hole 1031 is further configured to be sleeved and fixed onto the first connection end 1013 and the second connection end 1023, so that the first main body portion 101 and the second main body portion 102 are connected through the flexible connection portion 103a. The first main body portion 101 and the second main body portion 102 are connected through the flexible connection portion 103a, so that a flexible connection is formed between the first main body portion 101 and the second main body portion 102, thereby facilitating the wearing by users.

In this embodiment, the flexible connection portion 103a is provided with a through installation through hole which is arranged along the extending direction D1, each of two ends of the installation hole 1031 is respectively configured to sleeve and fix the first connection end 1013 and the second connection end 1023. Adopting one installation through hole is simple in process and offers flexible assembly space. However, in an alternative embodiment, the flexible connection portion 103a may also have two blind holes (i.e., non-through holes) which are arranged oppositely. The two blind holes are respectively configured to sleeve and fix the first connection end 1013 and the second connection end 1023.

In an embodiment, an inner sidewall of the at least one installation hole 1031 is provided with a first anti-detachment structure (such as a first buckle slot) and a second anti-detachment structure (such as a second buckle slot), the first anti-detachment structure is configured to be snap-fitted and connected to the first buckle 10131 on an outer surface of the first connection end 1013, the second anti-detachment structure is configured to be snap-fitted and connected to the second buckle 10331 on an outer surface of the second connection end 1023, and at least one of the first anti-detachment structure and the first buckle 10131 includes a plurality of convex-concave structures arranged in sequence along the extending direction D1.

Specifically, in this embodiment, the first anti-detachment structure includes a plurality of first buckle slots 1023*a* arranged along the extending direction, and the first buckle slot 1023*a* is configured to be meshed and connected to a plurality of projections arranged along the extending direction on the first buckle 10131; the second anti-detachment structure includes a plurality of second buckle slots 1023*b* arranged along the extending direction, and the second buckle slot 1023*b* is configured to be meshed and connected to a plurality of projections arranged along the extending direction on the second buckle 10331; the first anti-detachment structure is configured to be detachably connected to the first buckle 10131, and the second anti-detachment structure is configured to be detachably connected to the second buckle 10331.

In an embodiment, the flexible connection portion 103*a* is in an arc-shaped and provided with an inner side adjacent to a human neck and an outer side away from the human neck, the first anti-detachment structure is arranged on an inner sidewall of one side of the at least one installation hole 1031 adjacent to the outer side, and the second anti-detachment structure is arranged on an inner sidewall of the other side of the at least one installation hole 1031 adjacent to the outer side.

In an embodiment, the flexible connection portion 103*a* is provided with a first fixing structure 103*b* and a second fixing structure 103*c*, the first fixing structure 103*b* and the second fixing structure 103*c* are respectively arranged on each of two ends of the flexible connection portion 103*a*, the first fixing structure 103*b* is configured to connect to a third fixing structure 1013*a* of the first connection end 1013, the second fixing structure 103*c* is configured to connect to a fourth fixing structure 1023*a* of the second connection end 1023; the first fixing structure 103*b* is configured to detachably connect to the third fixing structure 1013*a*, and the second fixing structure 103*c* is configured to detachably connect to the fourth fixing structure 1023*a*.

In an embodiment, one of the first fixing structure 103*b* and the third fixing structure 1013*a* is a first fixing post 141, one of the first fixing structure 103*b* and the third fixing structure 1013*a* is a first fixing hole 142; one of the second fixing structure 103*c* and the fourth fixing structure 1023*a* is a second fixing post 143, one of the second fixing structure 103*c* and the fourth fixing structure 1023*a* is a second fixing hole 144, the first fixing structure 103*b* extends along a direction D2 of a first tangent line perpendicular to the extending direction, and the second fixing structure 103*c* extends along a direction D3 of a second tangent line perpendicular to the extending direction.

In an embodiment, the first fixing post 141 includes a first post body 1411 and a first buckle hook portion 1412 connected to one end of the first post body 1411 away from the flexible connection portion 103*a*, and an outer diameter of the first buckle hook portion 1412 is greater than an outer diameter of the first post body 1411 to prevent the first fixing post 141 from detaching from the first fixing hole 142; the second fixing post 143 includes a second post body 1431 and a second buckle hook portion 1432 connected to one end of the second post body 1431 away from the flexible connection portion 103*a*, and an outer diameter of the second buckle hook portion 1432 is greater than an outer diameter of the second post body 1431 to prevent the second fixing post 143 from detaching from the second fixing hole 144.

In an embodiment, the first fixing hole 142 includes a first portion 1421 corresponding to the first post body 1411 and a second portion 1422 corresponding to the first buckle hook portion 1412, and a hole diameter of the second portion 1422 is greater than a hole diameter of the first portion 1421; the second fixing hole 144 includes a third portion 1441 corresponding to the second post body 1431 and a fourth portion 1442 corresponding to the second buckle hook portion 1432, and a hole diameter of the fourth portion 1442 is greater than a hole diameter of the third portion 1441.

In an embodiment, the connection member 103 includes at least one neck support (such as a first neck support portion 111 and a second neck support portion 112), the at least one neck support is connected to the inner side of the flexible connection portion 103*a* adjacent to the human neck, and the at least one neck support is configured to form at least one air inlet gap with the first main body portion 101 or the second main body portion 102, so that air of the first main body portion 101 or the second main body portion 102 can enter the air inlet gap (such as 121, 131). Thereby preventing the human neck from directly contacting with the first main body portion 101 or the second main body portion 102, and avoiding the situation that wind cannot be provided to a surface of the neck skin.

As shown previously, in this embodiment, the at least one neck support includes the first neck support portion 111 and the second neck support portion 112, the first neck support portion 111 is positioned adjacent to the first main body portion 101 and is configured to form a first air inlet gap 121 with the first main body portion 101, and the second neck support portion 112 is positioned adjacent to the second main body portion 102 and is configured to form a second air inlet gap 131 with the second main body portion 102.

In an embodiment, a plurality of projections 103*m* are arranged on surfaces of the first neck support portion 111 and the second neck support portion 112 away from the flexible connection portion 103*a*, and the plurality of projections 103*m* are configured to form a gap between the at least one neck support and the human neck skin. The plurality of projections 103*m* are further configured to avoid the situation that the human neck directly contacts the first main body portion 101 or the second main body portion 102, resulting in the inability to supply wind to the surface of the neck skin.

It can be seen that the surfaces of the first neck support portion 111 and the second neck support portion 112 away from the flexible connection portion 103*a* are arc-shaped. A size of the plurality of projections gradually decreases from a middle to two ends along a vertical direction D4 perpendicular to the extending direction D1. Thereby achieving a comfortable wearing effect.

In this embodiment, the flexible connection portion 103*a*, the first neck support portion 111 and the second neck support portion 112 are made of a flexible material, such as the same flexible material (such as a flexible silica gel material), and they are integrally formed. Thereby achieving a comfortable wearing effect.

Furthermore, the flexible connection portion 103*a* includes a main body portion 103*b*, a first extending portion 103*e* and a second extending portion 103*f*, the main body portion 103*d* is provided with the at least one installation hole 1031, the first extending portion 103*e* and the second extending portion 103*f* are respectively connected to each of two ends of the main body portion 103*b*, the first extending portion 103*e* and the second extending portion 103*f* protrude from the main body portion 103*b* along the extending direction D1, the first extending portion 103*c* and the second extending portion 103*f* are respectively configured to cover and connect to an inner surface of the first connection end 1013 adjacent to the human neck and an inner surface of the second connection end 1023 adjacent to the human neck. The first fixing structure and the second fixing structure are respectively arranged on the first extending portion 103*e* and the second extending portion 103*f*, thereby the first fixing structure and the second fixing structure being adjacent to an inner side of the human neck. The first anti-detachment structure and the second anti-detachment structure are positioned away from an outer side of the human neck, and the internal and external cooperation enables the connection member 103 to reliably connect the first main body portion 101 and the second main body portion 102, preventing the connection parts from easily getting detached.

In this embodiment, the first air guide chamber 2 is located inside the first main body portion 101; the first main body portion 101 is further provided with a first mounting chamber 1014; and the first power supply assembly 8 is located inside the first mounting chamber 1014. The second air guide chamber 4 is located inside the second main body portion 102; the second main body portion 102 is further provided with a second mounting chamber 1024; and the second power supply assembly 9 is located inside the second mounting chamber 1024.

In this embodiment, the first main body portion 101 is further provided with a first switch 1015, a first charging interface 1016, and a first indication module 1017; and the first switch 1015, the first charging interface 1016, and the first indication module 1017 are all electrically connected to the first power supply assembly 8. The second main body portion 102 is further provided with a second switch 1025, a second charging interface 1026, and a second indication module 1027; and the second switch 1025, the second charging interface 1026, and the second indication module 1027 are all electrically connected to the second power supply assembly 9. Through the above structure, both the first switch 1015 and the second switch 1025 are configured to turn on or turn off the neck fan. The first charging interface 1016 and the second charging interface 1026 are configured to charge the first battery 81 and the second battery 91, respectively. The first indication module 1017 and the second indication module 1027 can be configured to: display whether the fan is in an ON or OFF state and display a wind rating of the fan.

In this embodiment, referring to FIG. 7 to FIG. 13, the neck fan further includes a first charging control module 811, a first battery protection module 812, a first charging indication module 813, a first main control module 814 and a first boost module 815; and the first charging control module 811, the first battery protection module 812, the first charging indication module 813, the first main control module 814 and the first boost module 815 can be arranged on the first circuit board 82.

The first charging interface 1016 and the first charging control module 811 are both electrically connected to the first battery 81; the first charging indication module 813 is connected to the first charging control module 811; the first charging interface 1016 and the first charging control module 811 are configured to charge the first battery 81; the first battery level indication module 813 is configured to display a state of charging; and the first battery protection module 812 is electrically connected to the first charging control module 811 and the first battery 81 to protect the first battery 81.

The first main control module 814, the first boost module 815, and a first motor 32 are all electrically connected to the first battery 81; the first switch 1015 and the first indication module 1017 are electrically connected to the first main control module 814; and the first indication module 1017 is configured to display turning on or turning off of the neck fan. It can be understood that the first indication module 1017 and the first charging indication module 813 constitute a first status indication module, which is used to display at least one of the startup status, shutdown status, charging status, and output wind level of the first fan main body or the neck fan. In this embodiment, both the first indication module 1017 and the first charging indication module 813 are indication modules. However, in other embodiments, the first status indication module may also be one or more display screens, such as an LED display screen, a liquid crystal display screen, or an electronic ink display screen.

In this embodiment, the neck fan further includes a second charging control module 921, a second battery protection module 922, a second charging indication module 923, a second main control module 924 and a second boost module 925; and the second charging control module 921, the second battery protection module 922, the second charging indication module 923, the second main control module 924 and the second boost module 925 can be arranged on the second circuit board 92.

The second charging interface 1026 and the second charging control module 921 are both electrically connected to the second battery 91; the second charging indication module 913 is connected to the second charging control module 921; the second charging interface 1026 and the second charging control module 921 are configured to charge the second battery 91; the second charging indication module 923 is configured to display a state of charging; and the second battery protection module 922 is electrically connected to the second charging control module 921 and the second battery 91 to protect the second battery 91.

The second main control module 924, the first boost module 925, and a second motor 52 are all electrically connected to the second battery 91; the second switch 1025 and the second indication module 1027 are electrically connected to the second main control module 924; and the second indication module 1027 is configured to display turning on or turning off of the neck fan. It can be understood that the second indication module 1027 and the second charging indication module 923 constitute a second status indication module, which is used to display at least one of the startup status, shutdown status, charging status, and output wind level of the second fan main body or the neck fan. In this embodiment, both the second indication module 1027 and the second charging indication module 923 are indication modules. However, in other embodiments, the second status indication module may also be one or more display screens, such as an LED display screen, a liquid crystal display screen, or an electronic ink display screen.

In this embodiment, the first main body portion 101 is provided with a first conductive end 1018; the second main body portion 102 is provided with a second conductive end 1019; when the first conductive end 1018 is communicated to the second conductive end 1019, the first switch 1015 is electrically connected to the first main control module 814 and the second main control module 924 respectively, and the second switch 1025 is electrically connected to the first main control module 814 and the second main control module 924 respectively; and the first switch 1015 or the second switch 1025 is configured to send a third fan working signal.

The first main control module 814 is configured to: receive the third fan working signal and drive the first boost module 815 to receive and boost the output voltage of the first battery 81, to drive the first motor 32 to work; and the second main control module 924 is configured to: receive the third fan working signal and drive the second boost module 925 to receive and boost the output voltage of the second battery 91, to drive the second motor 52 to work.

Figure 14:
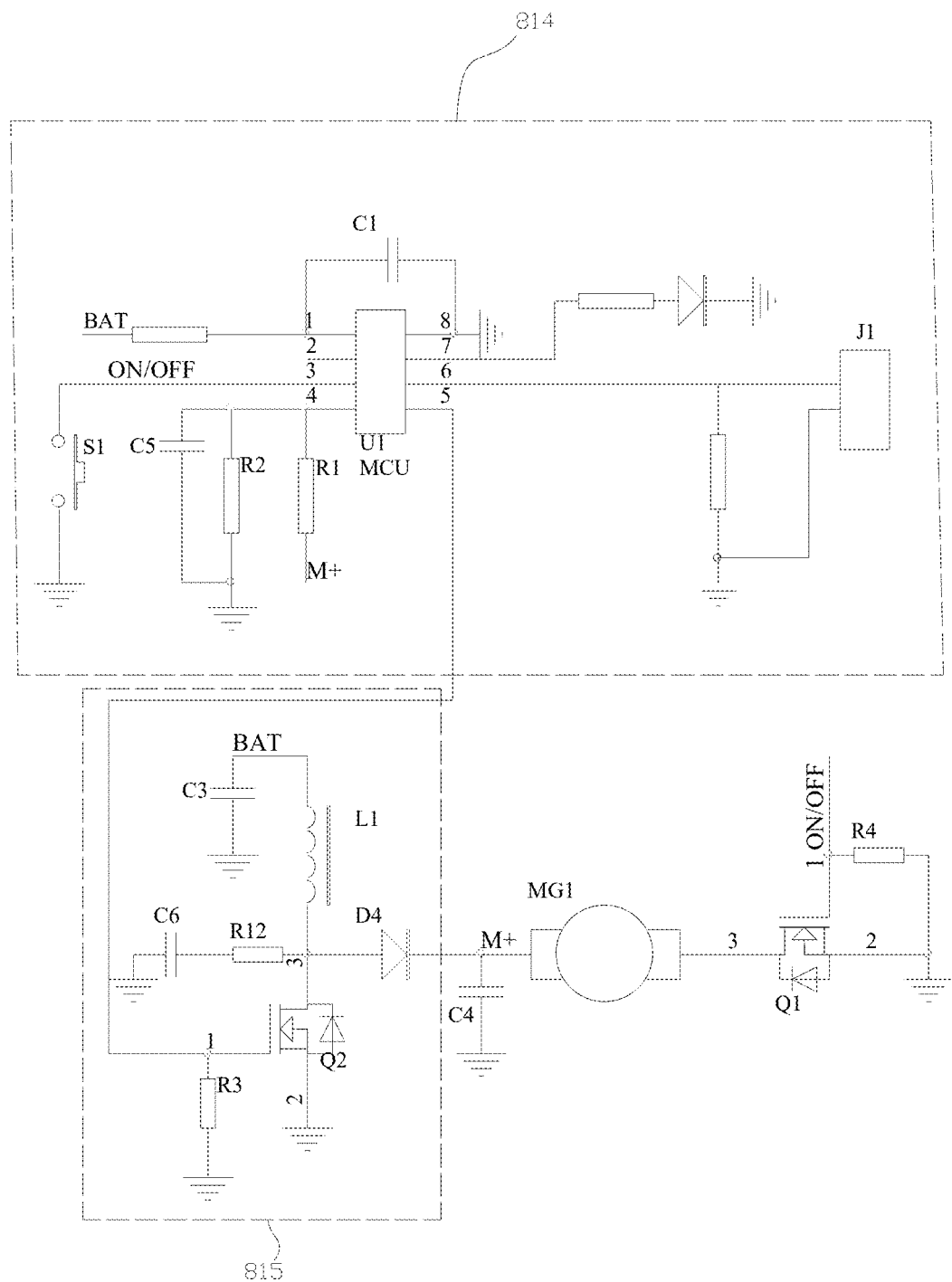
FIG. 14 is a circuit diagram of a first main control module, a first boost module and a first motor of a neck fan according to another modified embodiment of the present invention.

It can be understood that, referring to FIG. 14, in one embodiment, when any one of the first switch 1015 and the second switch 1025 is operated by the user, a third fan working signal can be sent, so that both the first motor 32 and the second motor 52 work. Specifically, the first conductive end 1018 of the first main body portion 101 may have a connector J1 for connecting with the connector J1 of the second conductive end 1019 of the second main body portion 102, thereby realizing the electrical connection between the first main control module 814 and the second main control module 924, and further realizing that when any one of the first switch 1015 and the second switch 1025 is operated by the user, a third fan working signal can be sent out. Specifically, the connector J1 may have two signal terminals, but it is not limited to the above.

It can be understood that when the connector J1 of the first conductive end 1018 of the first main body portion 101 is not connected to the connector J1 of the second conductive end 1019 of the second main body portion 102, that is, when the first main body portion 101 and the second main body portion 102 are independent of each other, the first switch 1015 and the second switch 1025 can independently control the operation of the two fan assemblies respectively, and they do not affect each other.

In addition, in some other embodiments, through preset program control, which one of the first switch 1015 and the second switch 1025 dominates the control of the two fan assemblies can be determined according to the need. Specifically, in another embodiment, only when one of the first switch 1015 and the second switch 1025 (such as the first switch) is operated by the user, will the third fan working signal be sent out to make the first motor 32 and the second motor 52 work simultaneously.

Figure 13:
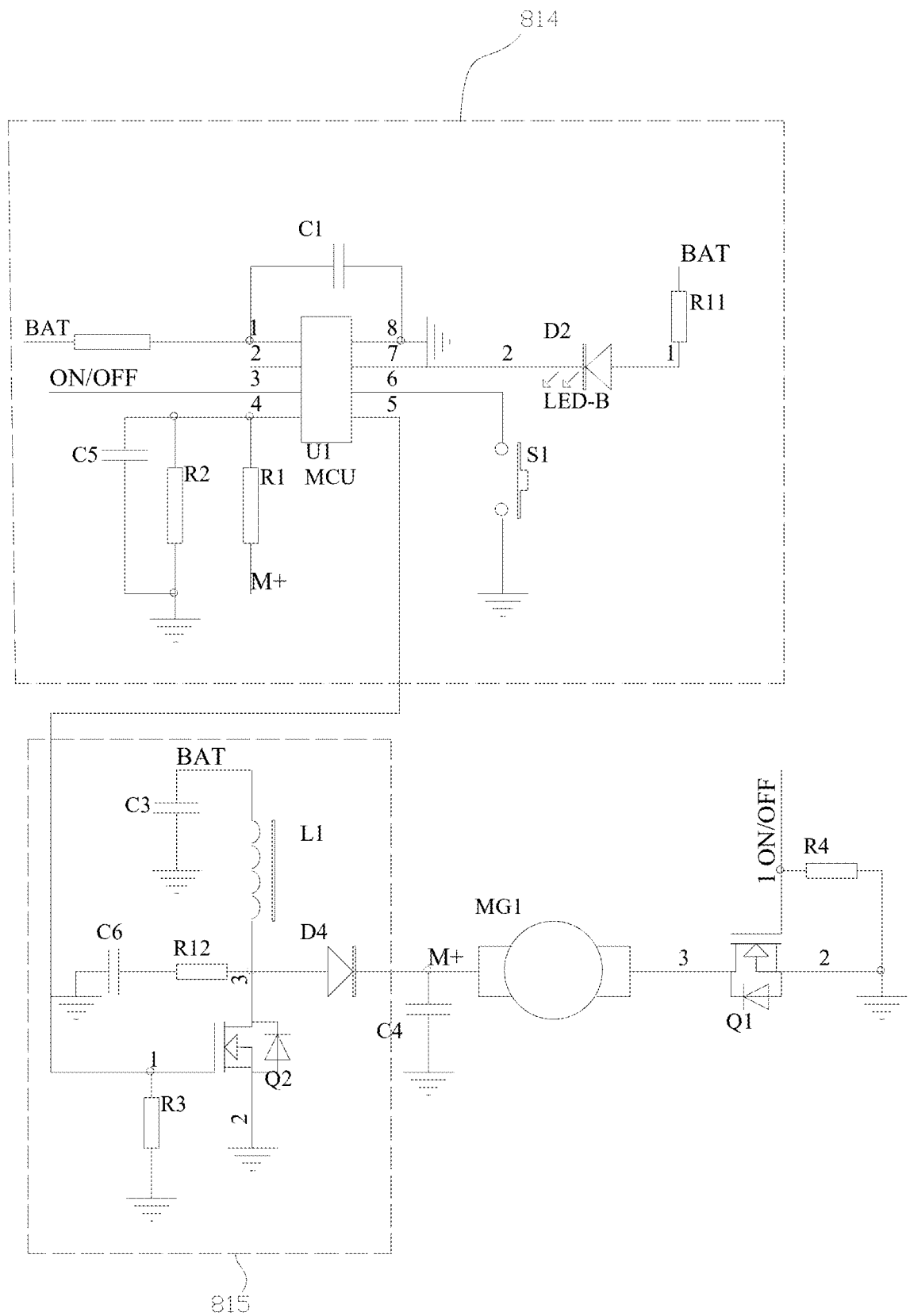
FIG. 13 is a circuit diagram of a first main control module, a first boost module and a first motor of the neck fan according to an alternative embodiment of the present invention.
Figure 15:
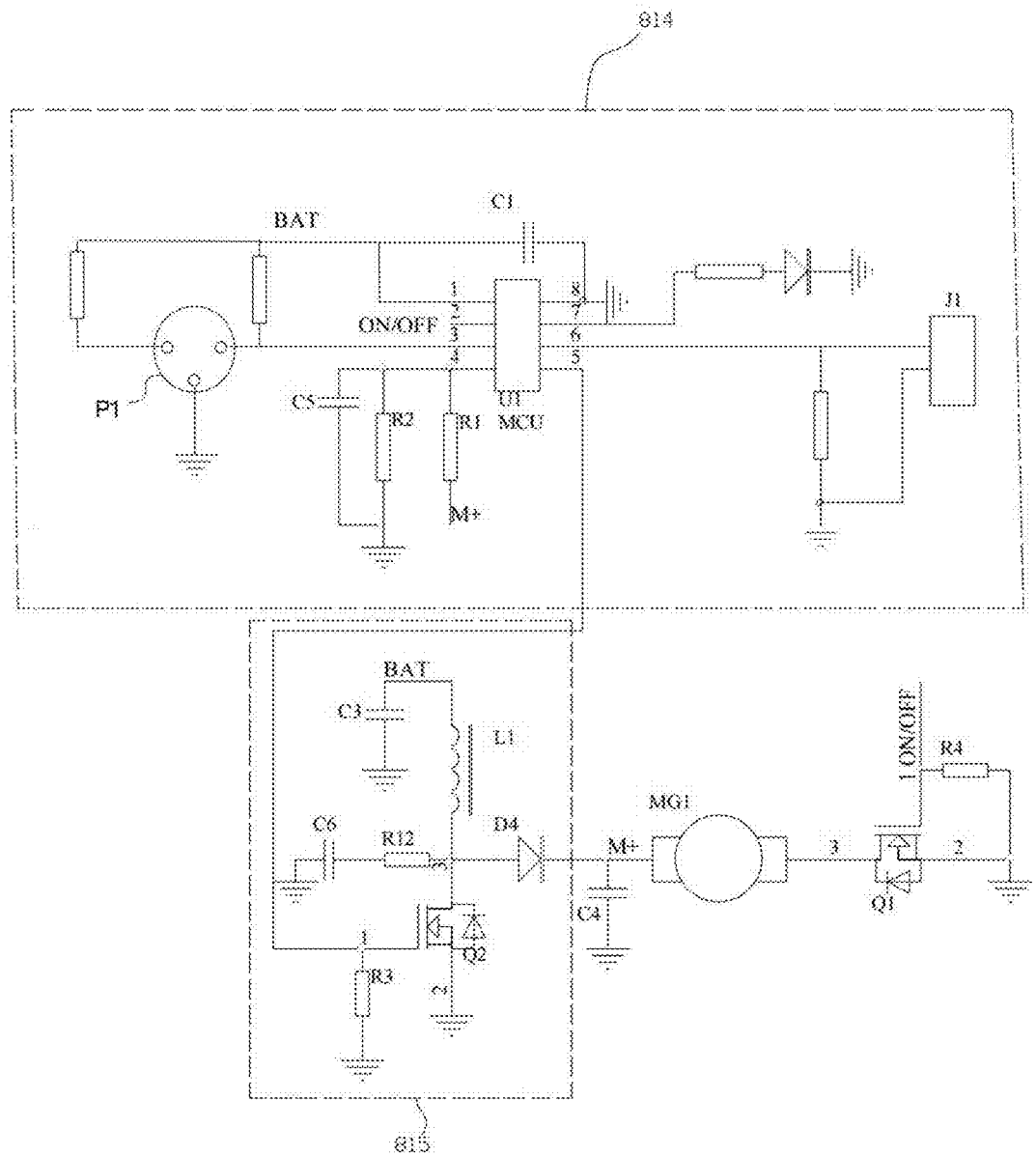
FIG. 15 is a circuit diagram of the first main control module, the first boost module and the first motor of the neck fan according to another modified embodiment of the present invention.

Specifically, referring to FIG. 13 and FIG. 14, the first switch 1015 and the second switch 1025 may include a key switch S1. In other embodiments, referring to FIG. 15, the first switch 1015 and the second switch 1025 may also include a stepless adjustment key P1 (such as a knob or a slide adjustment key) that enables stepless adjustment. Through the stepless adjustment key P1, the rotational speed of the fan assembly can be controlled, thereby controlling the wind force. The stepless adjustment key P1 includes, but is not limited to, stepless adjustment devices such as a potentiometer with variable electric resistance and an encoder. In one embodiment, the stepless adjustment key P1 may include a plurality of connection terminals and at least one adjustment pin. One of the plurality connection terminals can be grounded, and at least one adjustment pin position can be operated by the user so that the other connection terminals output corresponding stepless adjustment signals. In other embodiments, a plurality of stepless adjustment pins can be provided, thus increasing more adjustment ranges and functions. It can be understood that the stepless adjustment key P1 enables the user to control the wind force of the neck fan according to their own needs, improving the user experience.

In this embodiment, the first main body portion 101 and the second main body portion 102 can be regarded as two independent fans electrically connected to each other to form the neck fan. The circuit diagrams of various circuit modules included in the two independent fans are the same.

Through the above structure, the first main body portion 101 and the second main body portion 102 are combined and spliced to form the complete U-shaped neck fan. At this time, the first conductive end 1018 is in conductive connection with the second conductive end 1019. When the user presses the first switch 1015 or the second switch 1025, the third fan working signal can be sent. At this time, after receiving the third fan working signal, the first main control module 814 drives the first boost module 815 to receive and boost the output voltage of the first battery 81, thereby driving the first motor 32 to work. The rotation of the first motor 32 can drive a first fan blade 33 to rotate, achieving the air blowing effect of the first fan assembly. After receiving the third fan working signal, the second main control module 924 drives the second boost module 925 to receive and boost the output voltage of the second battery 91, thereby driving the second motor 52 to operate. The rotation of the second motor 52 can drive a second fan blade 53 to rotate, achieving the air blowing effect of the second fan assembly.

Figure 11:
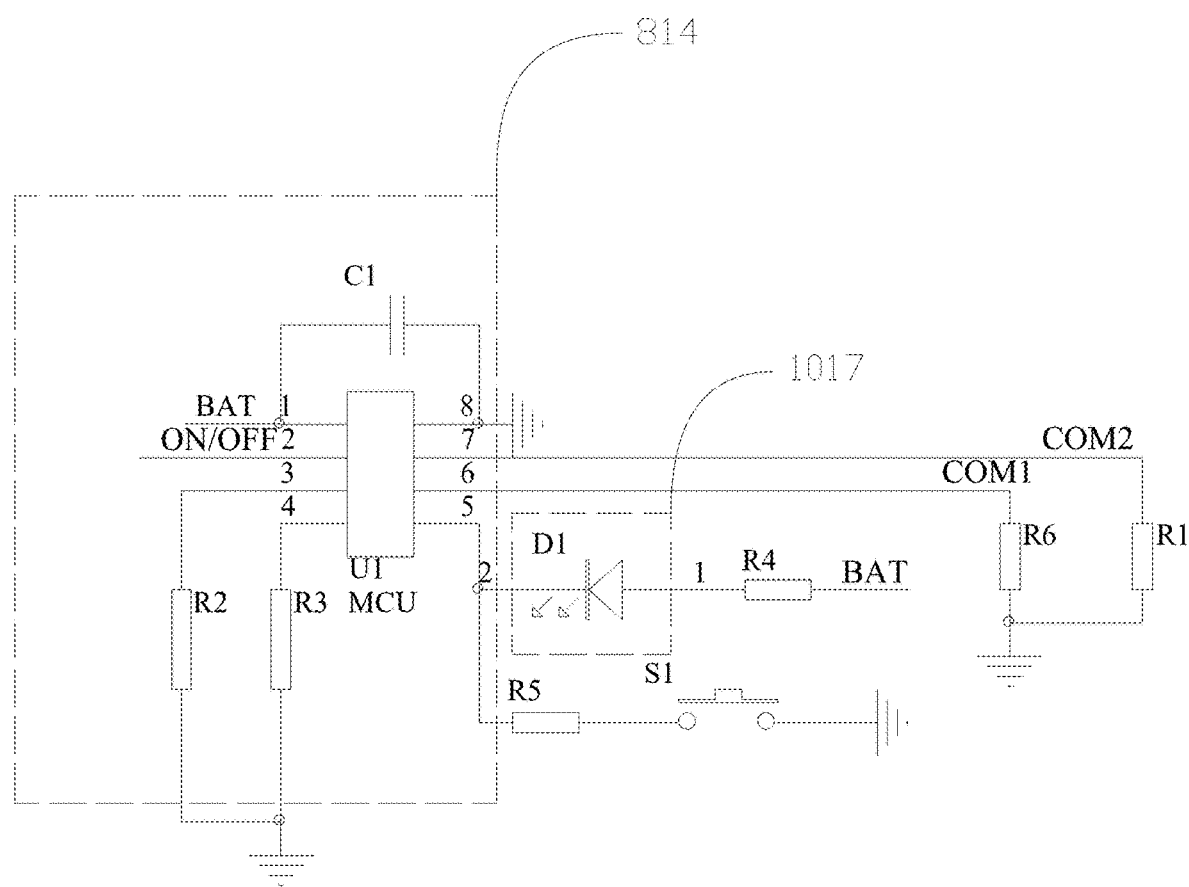
FIG. 11 is a circuit diagram of a first main control module of the neck fan of the present invention.
Figure 12:
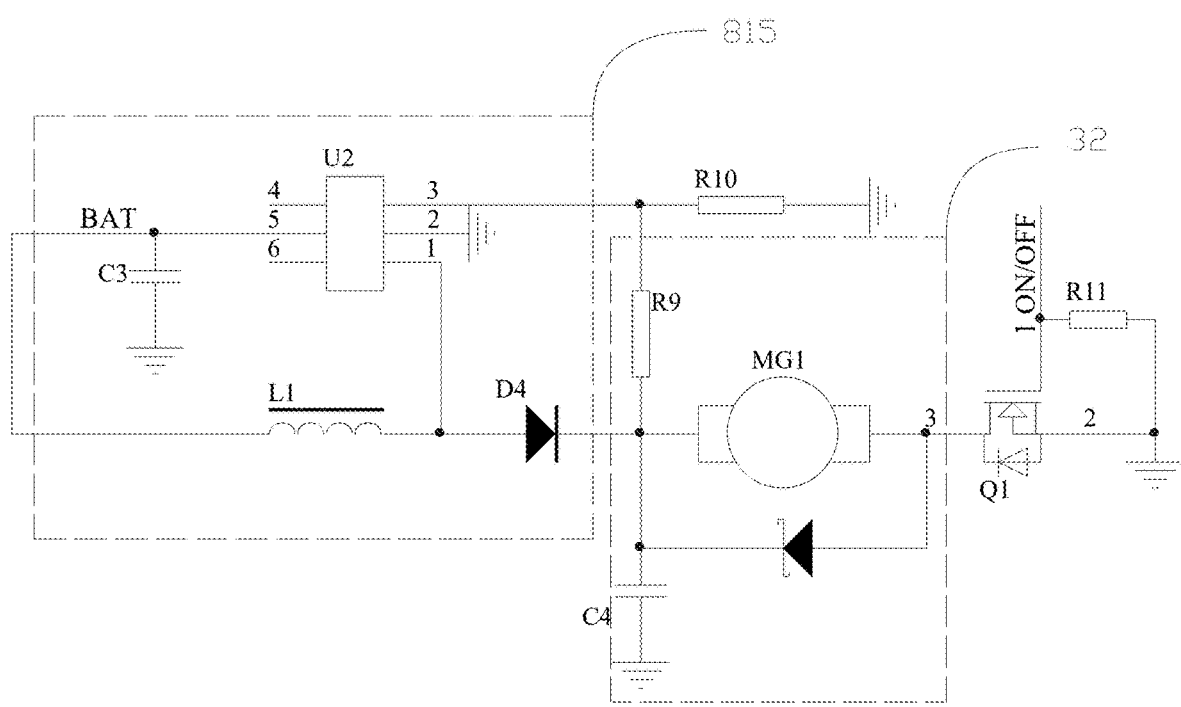
FIG. 12 is a circuit diagram of a first boost module and a first motor of the neck fan of the present invention.

It can be understood, the first main control module 814 of FIG. 11 and the first boost module 815 may have other embodiments. Referring to FIG. 12, in other embodiment, a boost control chip U2 of the first boost module 815 can be omitted. Specially, in the embodiment of FIG. 13, the first boost module 815 includes an inductor L1 and a switch element Q2, a control terminal of an MCU of the first main control module 814 is electrically connected to a control terminal of the switch element Q2, a first connection terminal of the switch element Q2 is electrically connected to the battery BAT via the first inductor L1, and a second connection terminal of the switch element Q2 is grounded. The first connection terminal of the switch element Q2 is also electrically connected to the first motor MG1, in detail, the first connection terminal of the switch element Q2 is also electrically connected to the first motor MG1 via a diode D4. The MCU of the first main control module 814 is configured to turn on/turn off the switch element Q2, such that a voltage of the battery BAT can boost, and a boosted voltage can be provided to the first motor MG1 to drive the first fan blade 33. Further, the second main control module 924 and the second boost module 925 of FIG. 5 also can have the same structure of the first boost module 815 and the first main control module 814 of FIG. 13, such that another boosted voltage can be provided to the second motor to drive the second fan blade 53.

Embodiment II

Figure 16:
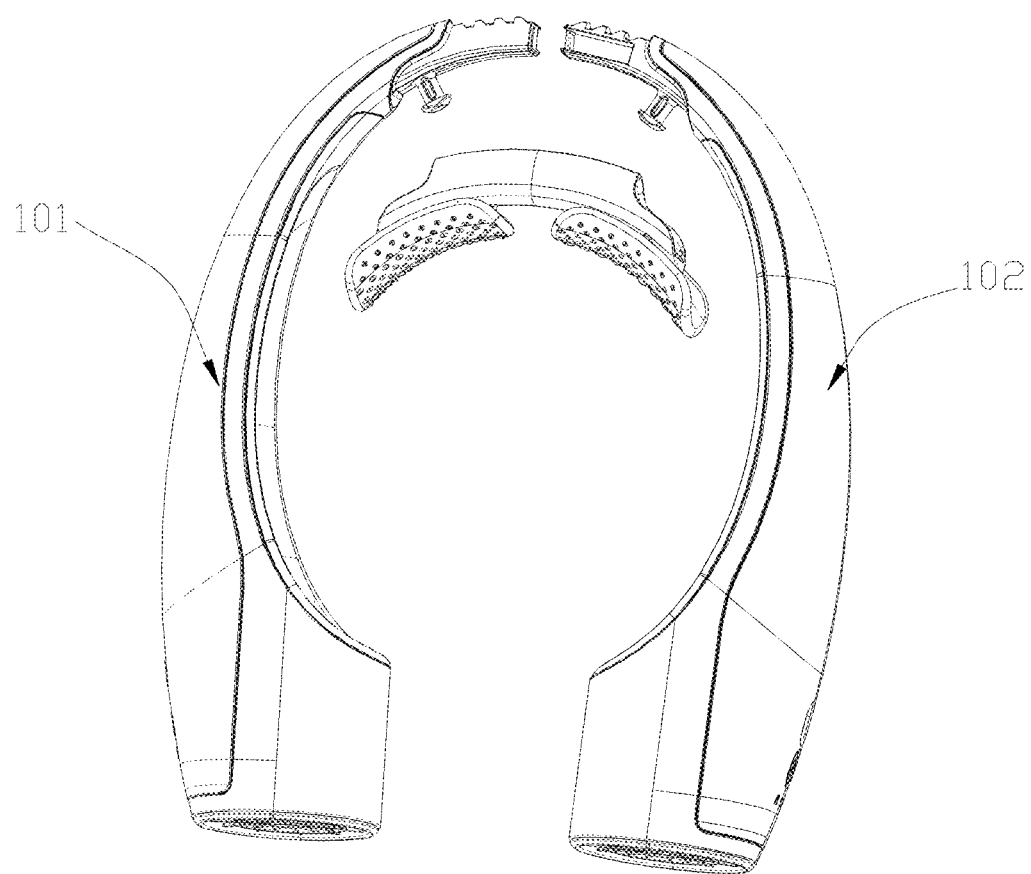
FIG. 16 is a schematic diagram of an entire structure of the neck fan according to Embodiment II of the present invention.
Figure 17:
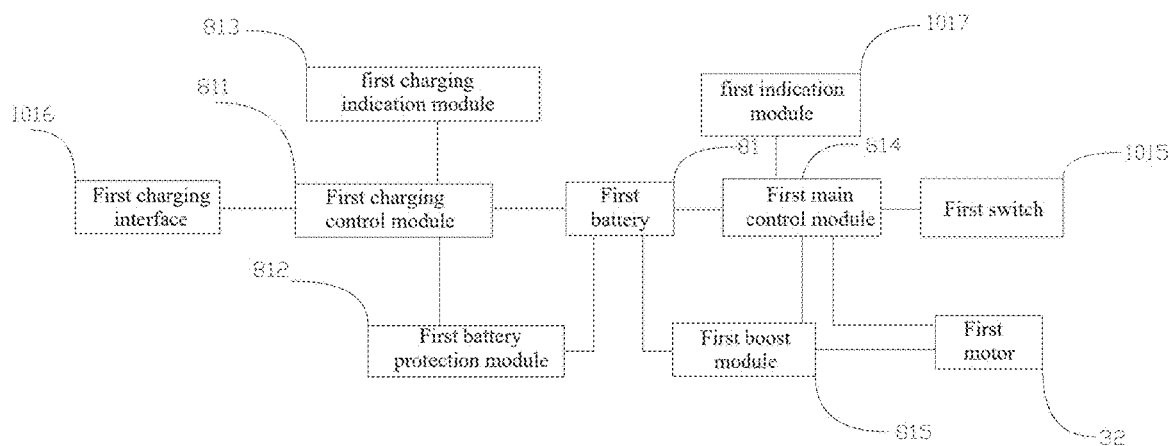
FIG. 17 is a schematic block diagram of a first main body portion of the neck fan according to Embodiment II of the present invention.
Figure 18:
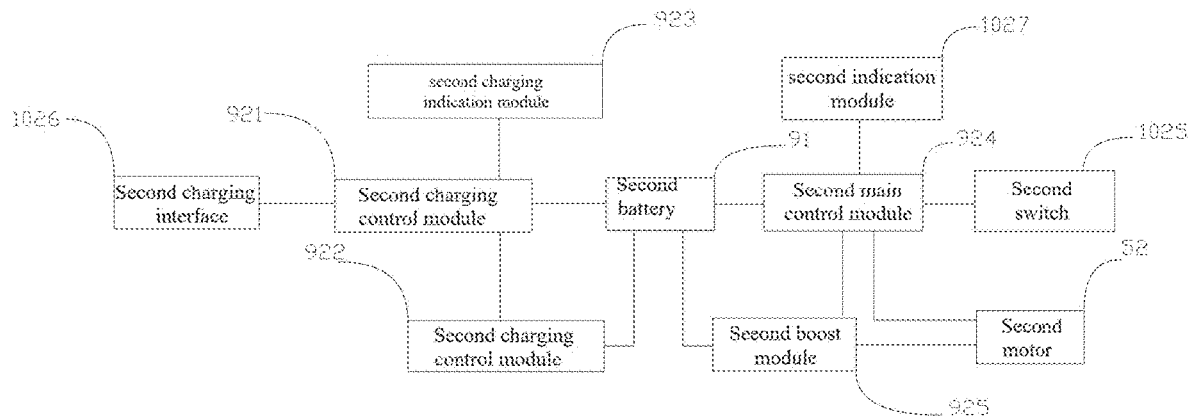
FIG. 18 is a schematic block diagram of a second main body portion of the neck fan according to Embodiment II of the present invention.
Figure 19:
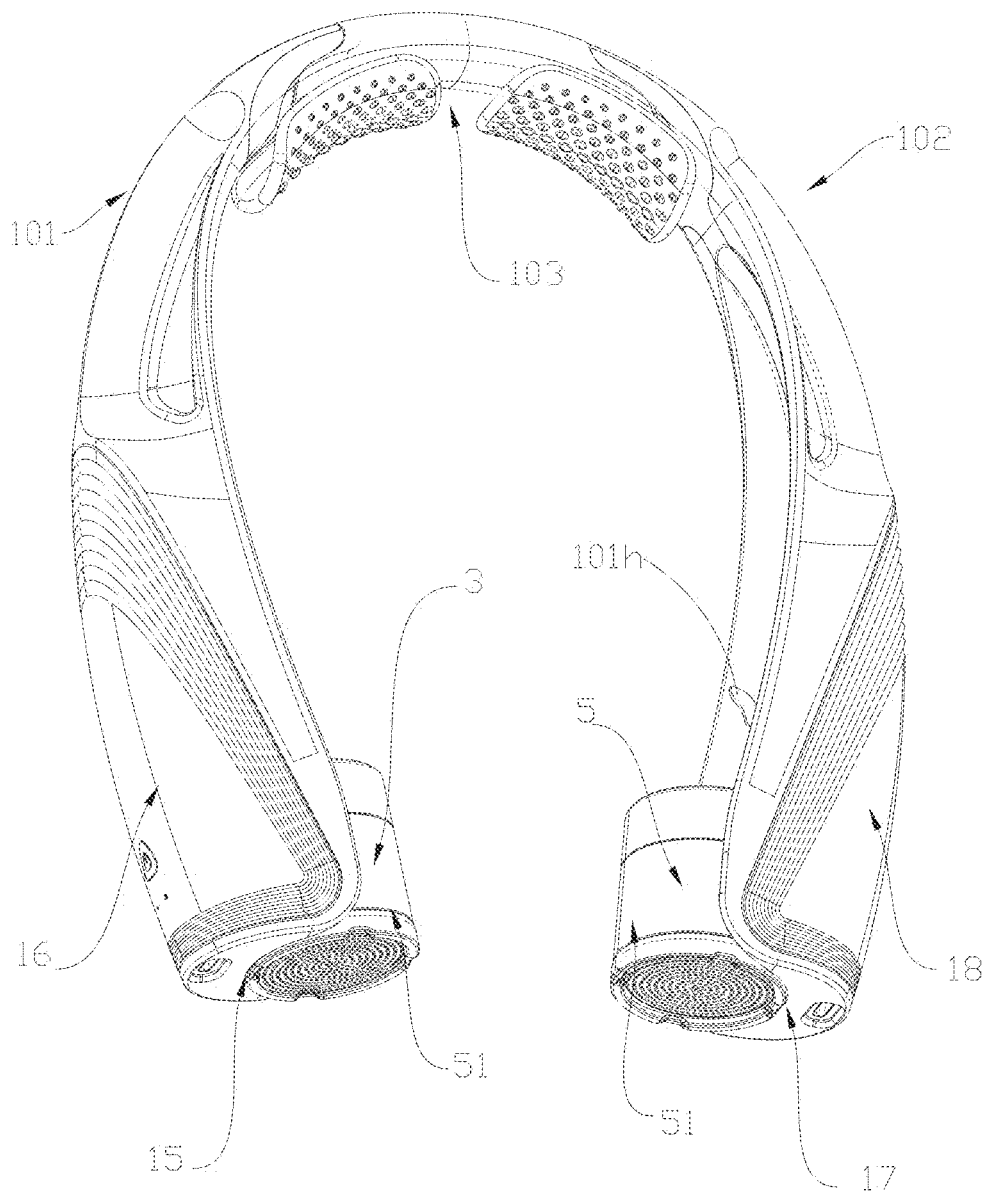
FIG. 19 is a schematic diagram of an entire structure of the neck fan according to Embodiment III of the present invention.
Figure 20:
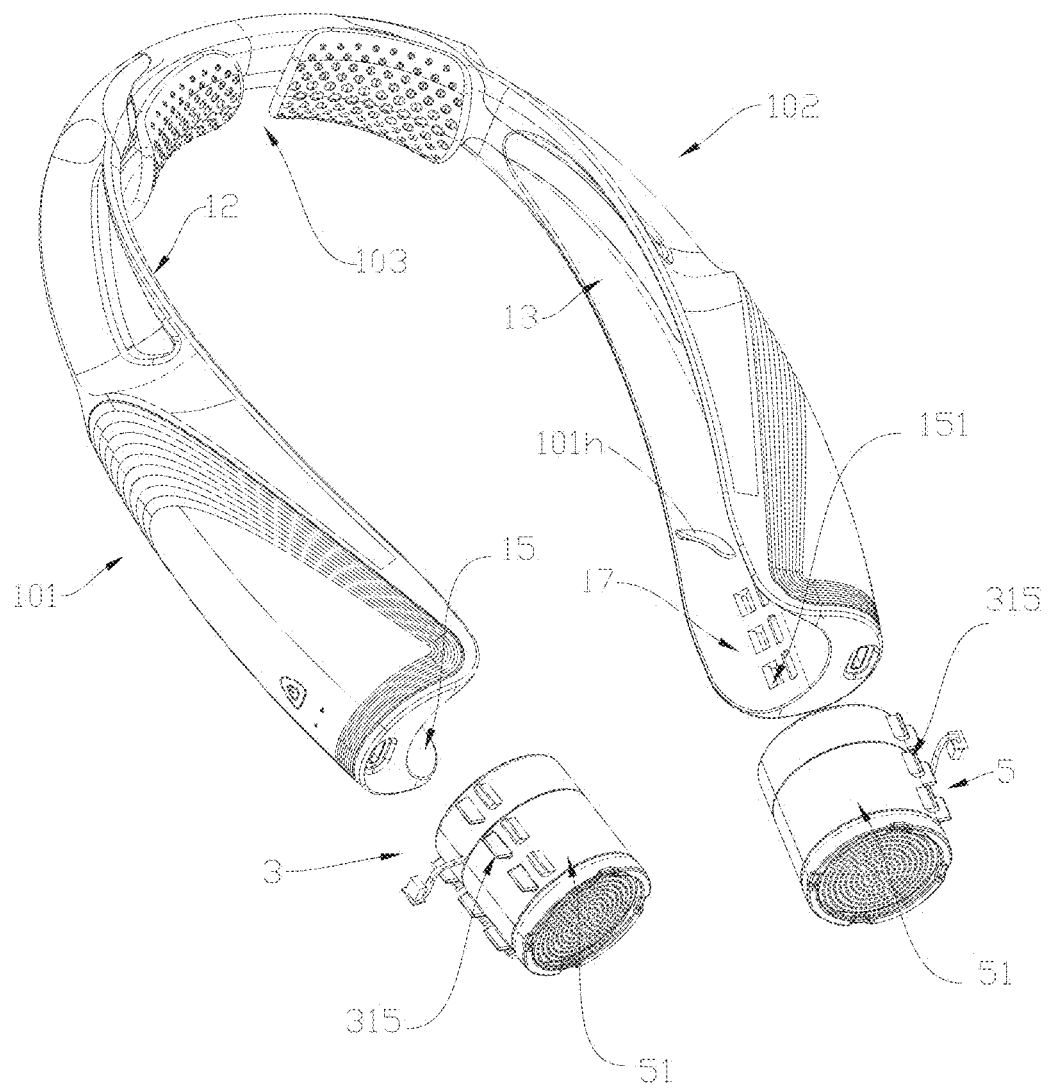
FIG. 20 is an exploded view of the neck fan according to Embodiment III of the present invention.
Figure 21:
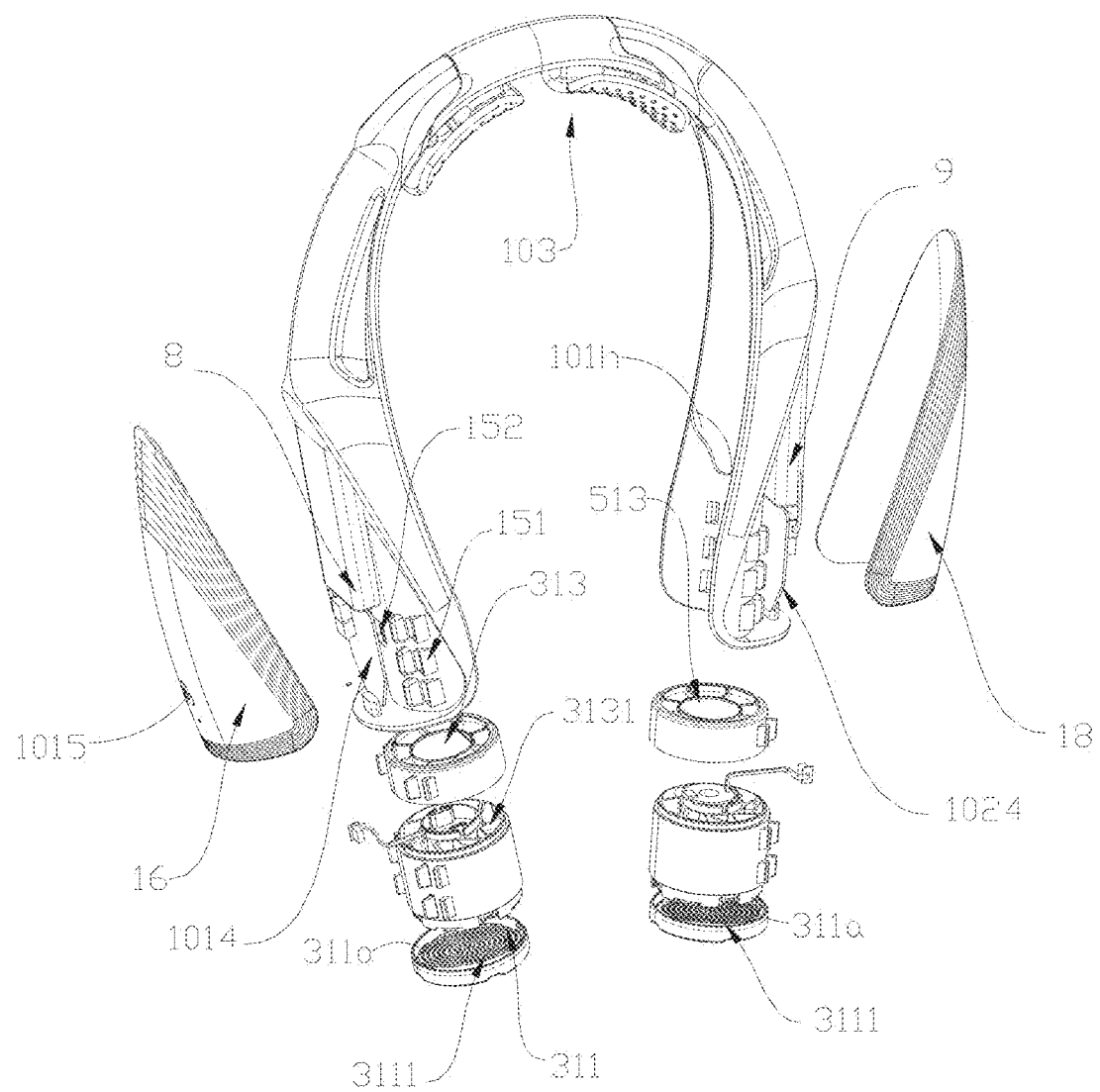
FIG. 21 is another exploded view of the neck fan according to Embodiment III of the present invention.
Figure 22:
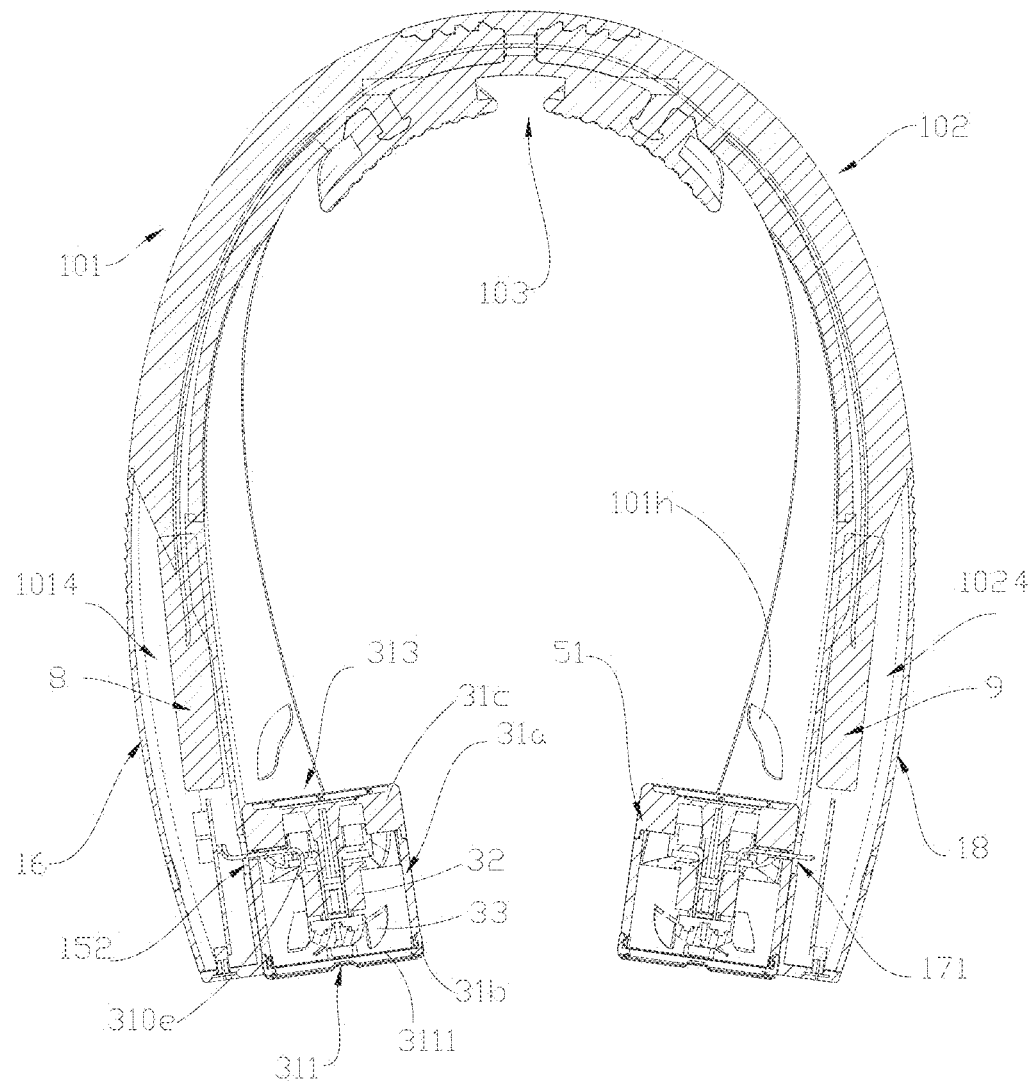
FIG. 22 is a cross-sectional view of the neck fan according to Embodiment III of the present invention.
Figure 23:
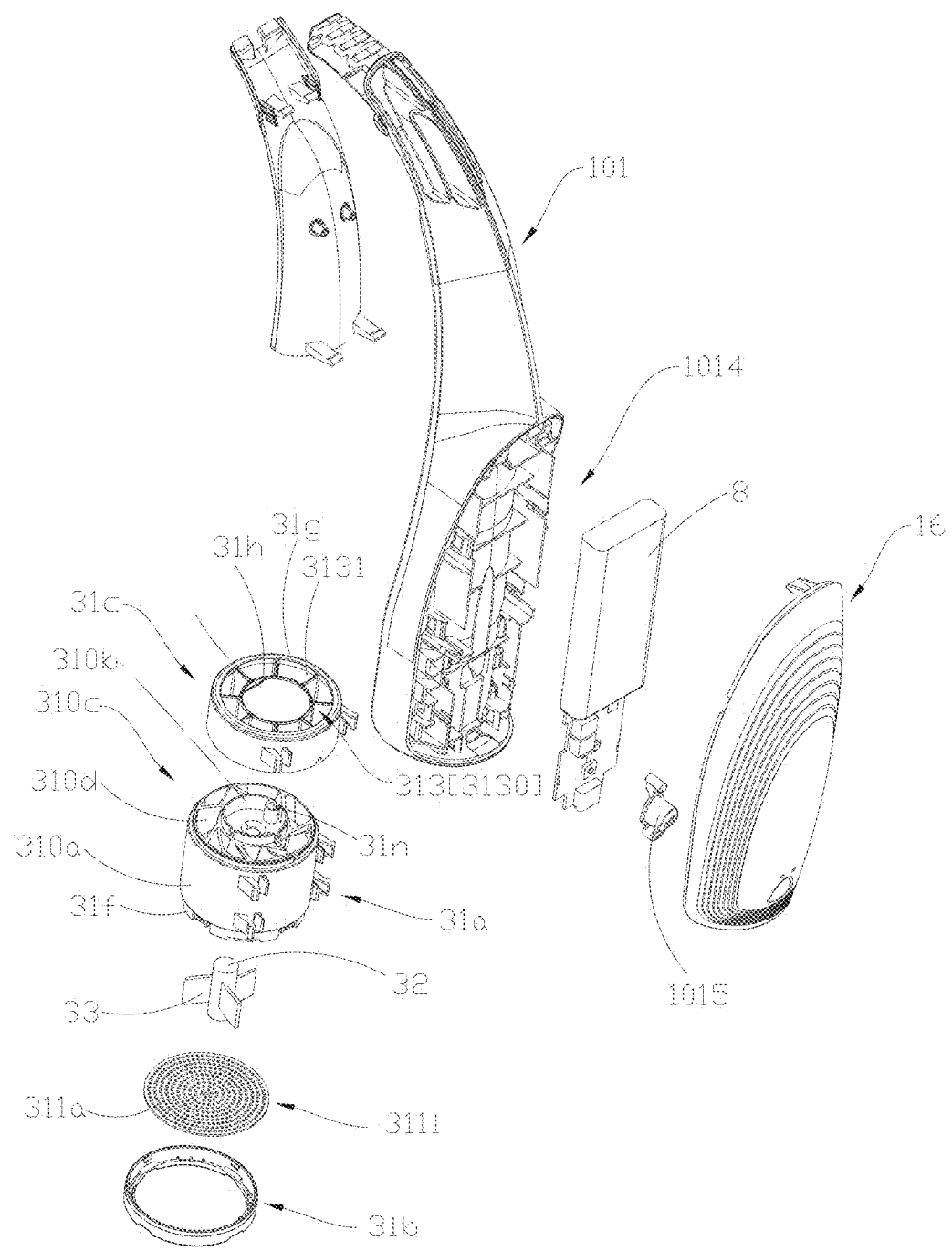
FIG. 23 is an exploded view of a fan main body of the present invention.
Figure 24:
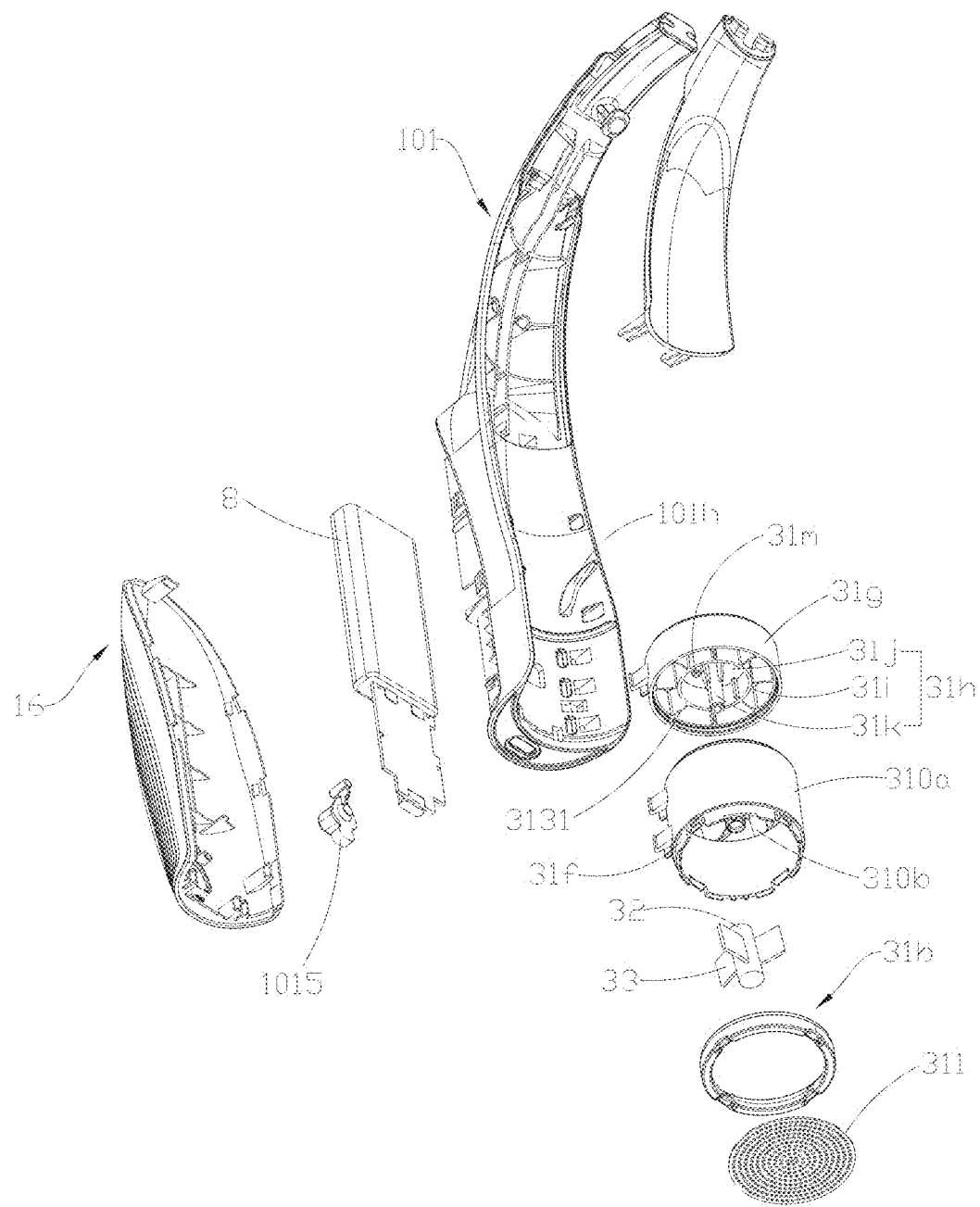
FIG. 24 is an exploded view of FIG. 23 from another angle.
Figure 25:
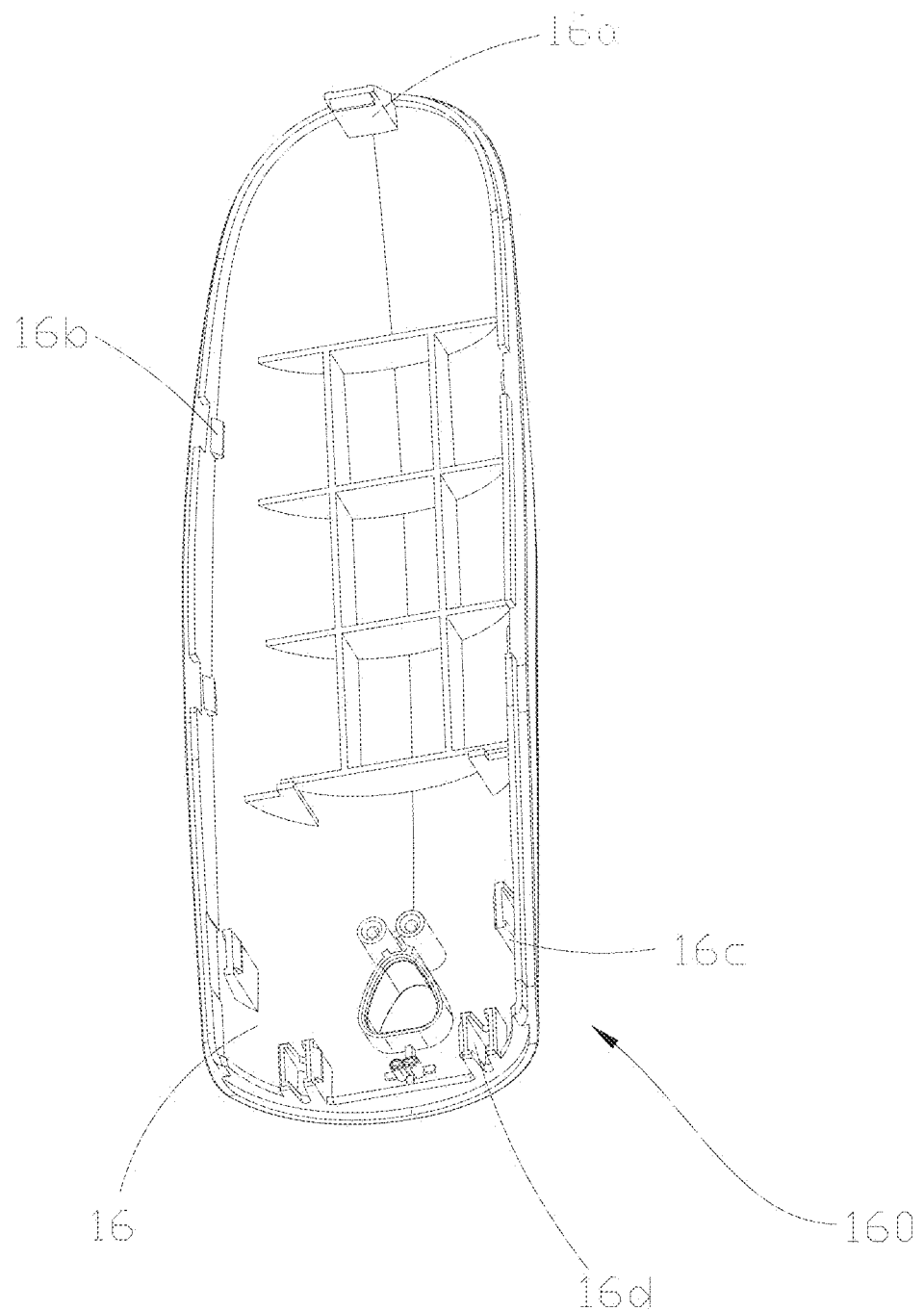
FIG. 25 is a schematic structural diagram of an outer side of a first main body portion of the fan main body shown in FIG. 23.
Figure 26:
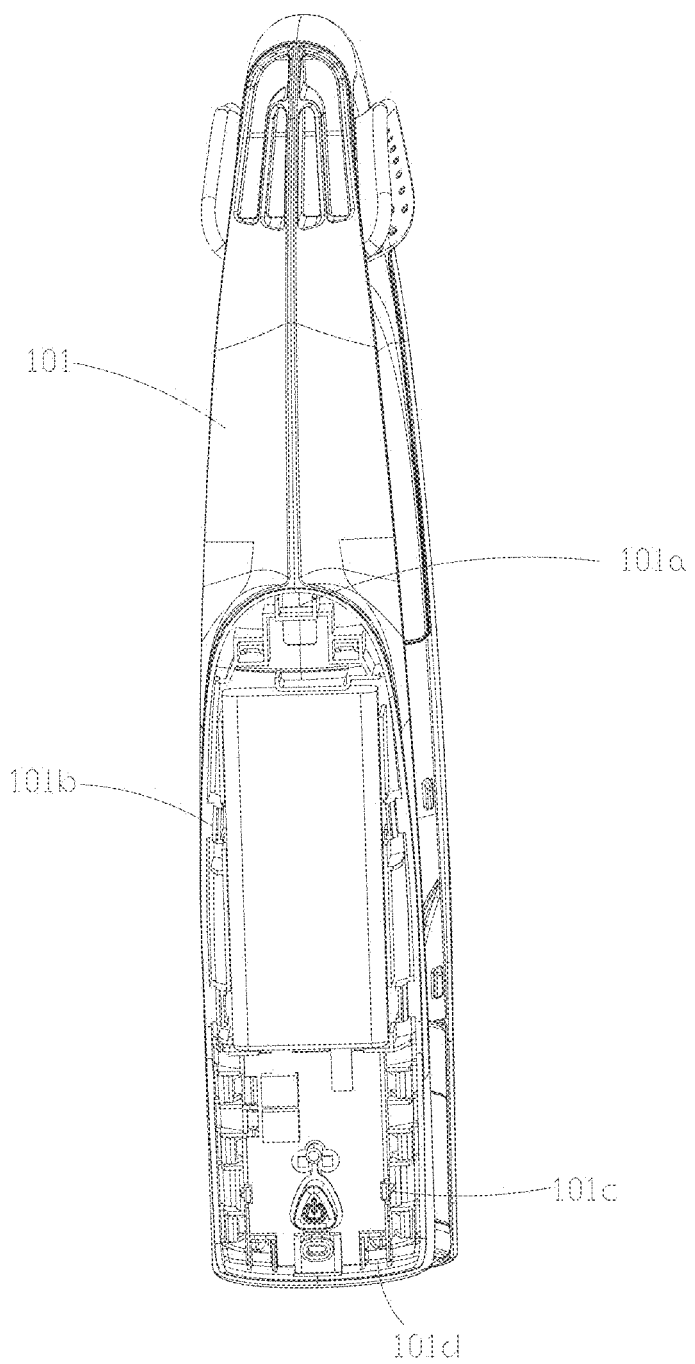
FIG. 26 is a schematic structural diagram of an inner side of a first outer cover body of the fan main body shown in FIG. 23.

Referring to FIG. 16 to FIG. 18, a difference between Embodiment II and Embodiment I is only that the first main body portion 101 and the second main body portion 102 of the neck fan are removed to form two independent fans, so that the first main body portion 101 and the second main body portion 102 are two small fans capable of working alone.

In this embodiment, the first main body portion 101 includes a first charging control module 811, a first battery protection module 812, a first charging indicator module 813, a first main control module 814, and a first boost module 815 which are electrically connected to the first circuit board 82.

The first charging interface 1016, the first charging control module 811, and the first charging indication module 813 are all electrically connected to the first battery 81; the first charging interface 1016 and the first charging control module 811 are configured to charge the first battery 81; the first charging indication module 813 is configured to display a battery level of the first battery 81; and the first battery protection module 812 is electrically connected to the first charging control module 811 and the first battery 81 to protect the first battery 81.

The first main control module 814, the first boost module 815, and a first motor 32 are all electrically connected to the first battery 81; the first switch 1015 and the first indication module 1017 are electrically connected to the first main control module 814; the first switch 1015 is configured to send a first fan working signal; the first main control module 814 is configured to: receive the first fan working signal and drive the first boost module 815 to receive and boost an output voltage of the first battery 81, to drive the first motor 32 to work; and the first indication module 1017 is configured to display turning on or turning off of the neck fan.

Through the above structure, the first charging interface 1016 is configured to charge the first battery 81; the first charging control module 811 is configured to control the charging of the first battery 81; when the first switch 1015 is turned on, the first fan working signal is sent; when receiving the first fan working signal, the first main control module 814 is configured to drive the first boost module 815 to receive and boost the output voltage of the first battery 81, to drive the first motor 32 to work; and the first main control module 814 can further adjust the speed of the first motor 32 by controlling the output voltage of the first boost module 815.

In this embodiment, the second main body portion 102 includes a second charging control module 921, a second battery protection module 922, a second charging indicator module 923, a second main control module 924, and a second boost module 925 which are electrically connected to the second circuit board 92.

The second charging interface 1026, the second charging control module 921, and the second charging indication module 923 are all electrically connected to the second battery 91; the second charging interface 1026 and the second charging control module 921 are configured to charge the second battery 91; the first charging indication module 923 is configured to display a battery level of the second battery 91; and the second battery protection module 922 is electrically connected to the second charging control module 921 and the second battery 91 to protect the second battery 91.

The second main control module 924, the second boost module 925, and a second motor 52 are all electrically connected to the second battery 91; the second switch 1025 and the second indication module 1027 are electrically connected to the second main control module 924; the second switch 1025 is configured to send a second fan working signal; the second main control module 924 is configured to: receive the second fan working signal and drive the second boost module 925 to receive and boost an output voltage of the second battery 91, to drive the second motor 52 to work; and the second indication module 1027 is configured to display turning on or turning off of the neck fan.

Through the above structure, the second charging interface 1026 is configured to charge the second battery 91; the second charging control module 921 is configured to control the charging of the second battery 91; when the second switch 1025 is turned on, the second fan working signal is sent; when receiving the second fan working signal, the second main control module 924 is configured to drive the second boost module 925 to receive and boost the output voltage of the second battery 91, to drive the second motor 52 to work; and the second main control module 924 can further adjust the speed of the second motor 52 by controlling the output voltage of the second boost module 925. This structural design achieves an effect of using independent portions as independent fans after the neck fan is disassembled, bringing higher flexibility, and a user can select an appropriate usage method according to a specific need.

Embodiment III

Referring to FIG. 19 to FIG. 26, Embodiment III of the present invention provides a neck fan. It can be understood that the descriptions of Embodiment I and Embodiment II mentioned previously are basically applicable to the neck fan of Embodiment III. Moreover, the following mainly describes the key contents of Embodiment III and the difference from Embodiment I and Embodiment II.

The neck fan includes a hanging main body 1. The hanging main body 1 includes a first main body portion 101, a second main body portion 102, a connection member 103 connecting the first main body portion 101 and the second main body portion 102, a first fan assembly 3 arranged at one end of the first main body portion 101 away from the connection member 103, and a second fan assembly 5 arranged at one end of the second main body portion 102 away from the connection member 103.

The connection member 103 is detachably connected to both the first main body portion 101 and the second main body portion 102; the first main body portion 101 is detachably connected to the first fan assembly 3; and the second main body portion 102 is detachably connected to the second fan assembly 5. Thus, all five portions of the neck fan are detachably connected, forming a modular design. This not only facilitates assembly but also reduces the costs of assembly and maintenance. Furthermore, users can disassemble, assemble, store by themselves and conduct DIY designs and so on, thereby improving the user experience.

The first main body portion 101 has an arc-shaped structure, and includes a concave first air guide path 12 positioned on a surface of one side of the first main body portion 101 and extended along an extending direction of the arc-shaped structure. Moreover, the first fan assembly 3 is arranged at one end of the first main body portion 101 and is configured to blow air towards the first air guide path 12. The first air guide path is configured to guide air of the first fan assembly 3 to one side of the first main body portion 101 (one side of the user's neck) and one end of the first main body portion 101 away from the first fan assembly 3 (such as the back of the user's neck).

The second main body portion 102 has an arc-shaped structure, and includes a concave second air guide path 13 positioned on a surface of one side of the second main body portion 102 and extended along an extending direction of the arc-shaped structure. Moreover, the second fan assembly 5 is arranged at one end of the second main body portion 102 and is configured to blow air towards the second air guide path 13. The second air guide path is configured to guide air of the second fan assembly 5 to one side of the second main body portion 102 (the other side of the user's neck) and one end of the second main body portion 102 away from the second fan assembly 5 (such as the back of the user's neck).

Furthermore, the first main body portion 101 and the first fan assembly 3 can also be assembled into one to form a first fan main body, and the second main body portion 102 and the second fan assembly 5 can also be assembled into one to form a second fan main body. Thus, a neck fan can be disassembled into two fan main bodies for use according to users' needs. It can be understood that when used as a neck fan, one fan main body and the other fan main body are respectively arranged on both sides of the user's neck. Moreover, the fact that a neck fan can be disassembled into two fan main bodies for use according to users' needs can enrich usage scenarios, facilitate storage and improve the user experience.

In some embodiments, the first fan main body and the second fan main body are manufactured independently and then connected together through an assembly process. Through the above arrangements, the two fan main bodies can also form a modular design. This not only facilitates assembly but also reduces the costs of assembly and maintenance. Moreover, users can disassemble, assemble, repair, store by themselves and conduct DIY designs and so on, thereby improving the user experience.

The first fan assembly 3 includes a straight-tube-shaped first fan shell 31, and the first fan shell 31 is detachably connected to the hanging main body 1 and is located within a first accommodating chamber 15, and the first fan shell 31 is provided with a third air inlet 311 and a third air outlet 313.

Through the above structure, due to the straight-tube shape of the first fan shell 31, the neck fan is formed into a vertical blowing type fan capable of blowing air in a vertical direction. The first fan assembly 3 can drive the air flow to be blown from the third air inlet 311 towards the user's neck via the third air outlet 313 along the first air guide path 12, greatly improving the air-blowing efficiency. The user can directly feel the cool air blown to the neck when using the neck fan, thereby improving the overall performance of the fan. Furthermore, the first fan shell 31 is detachably connected to the hanging main body 1, so that separate mold-opening, machining, and assembling can be achieved during production. The production efficiency is improved, the production cost is reduced. Moreover, it is also convenient for storage and transportation, and the portability of the product is improved.

In this embodiment, a plurality of connection buckle slots 151 are provided in an inner side of the first main body portion 101 of the hanging main body 1 adjacent to the first accommodating chamber 15; a plurality of connection buckles 315 matched and clamped with the connection buckle slots 151 are arranged on an outer wall of the first fan shell 31; and the first fan shell 31 is in detachably buckled connection to the hanging main body 1. Specifically, the connection buckle slots 151 are symmetrically distributed on an inner side of the hanging main body 1. There are six groups of connection buckle slots 151. Each group includes two connection buckle slots 151. The connection buckles 315 are symmetrically located on the outer wall of the first fan shell 31. There are six groups of connection buckles 315, and each group includes two connection buckles 315. Through the above structure, users can manually install or remove the first fan shell 31 from the hanging main body 1. The six-group buckle-matching structure ensures the firmness of the splicing, preventing the first fan shell from detaching during the wearing and use process, and improving the safety and convenience of the neck fan.

In this embodiment, the first main body portion 101 of the hanging main body 1 is detachably connected with a first outer cover 16 on an outer side away from the first accommodating chamber 15. As in Embodiment I, the first main body portion 101 of the hanging main body 1 is provided with a first mounting chamber 1014, and the first power supply assembly 8 is located inside the first mounting chamber 1014. The first mounting chamber 1014 has an opening, and the first outer cover 16 is detachably covered at the opening.

In this embodiment, the first fan assembly 3 also includes a first motor 32 and a first fan blade 33 mounted on a rotating shaft of the first motor 32.

The first fan shell 31 can include a shell main body 31a, an air inlet cover 31b, a metal barrier net 3111 and an air outlet hood 31c.

The first fan blade 33 and the first motor 32 are arranged within the shell main body 31a. Specifically, the shell main body includes a cylindrical sidewall structure 310a, a mounting portion 310b positioned at one end inside the sidewall structure 310a and an air guiding portion 310c connected between the mounting portion 310b and the sidewall structure 310a. The first fan blade 33 and the first motor 32 are arranged within the sidewall structure 310a, on one side of the mounting portion 310b, and the first motor 32 is mounted on the mounting portion 310b.

The air guiding portion 310c includes a plurality of air guiding blades 310d arranged at intervals and is configured to guide wind from the first fan blade 33 based on a preset direction. Specifically, the thickness of each air guiding blade 310d can gradually increase along a direction from the first fan blade 33 to the third air outlet 313, thus achieving a better air guiding effect. The air inlet cover 31b can be annular, and the air inlet cover 31b is sleeved on one end of the shell main body 31a. Specifically, an outer side surface of one end of the shell main body 31a can be provided with a stepped groove 31f, and the air inlet cover 31b is sleeved on the stepped groove 31f. After mounting, the outer side surface of the air inlet cover 31b is flush with the outer side surface of the shell main body 31a. The metal barrier net 3111 is mounted on the inner side of the air inlet cover 31b.

The metal barrier net 3111 is provided with the third air inlet 311. The third air inlet 311 includes a plurality of air inlet holes. Each air inlet hole 311a can be circular, and the diameters of the plurality of air inlet holes 311a can be the same. Each air inlet hole 311a can have a diameter ranging from 0.5 mm to 4 mm. Such a size can prevent hair or debris from being sucked into the interior of the first fan assembly 3. It can be understood that the metal barrier net 3111 is relatively thin and lightweight. This is conducive to the miniaturization and light weighting of the product. In addition, since it is made of metal material, the size of the air inlet holes of the metal barrier net 3111 can be arranged to be relatively small, thereby effectively preventing foreign objects from entering the first fan assembly 3.

The third air outlet 313 includes a plurality of air outlet holes 3130 arranged on the air outlet hood 31c. Specifically, the air outlet hood 31c includes an annular wall structure 31g, a mounting structure 31h and a plurality of air gathering rings 3131. The plurality of air gathering rings 3131 are connected between the annular wall structure 31g and the mounting structure 31h. Moreover, the plurality of air outlet holes 3130 are defined as the spaces between the plurality of air gathering rings 3131.

The inner side surface of the annular wall structure 31g is an inclined surface or an arc-shaped surface, so that an inner diameter of the annular wall structure 31g gradually decreases along a direction from the third air inlet 311 to the third air outlet 313. Thus, the blowing wind has a pressurizing effect and the outlet wind intensity is improved. The mounting structure 31h includes an annular mounting wall 31i, a cover plate 31j connected to the annular mounting wall 31i and a mounting column 31k connected to an inner side of the cover plate 31*j*, and the mounting column 31*k* is connected to the mounting portion 310*b*. Specifically, the mounting column 31*k* can be detachably inserted into a mounting hole of the mounting portion 310*b*, so that a detachable connection is formed between the air outlet hood 31*c* and the shell main body 31*a*. Moreover, the cover plate 31*j* is circular and is positioned in the middle of the plurality of air outlet holes 3130, and a groove is arranged on an outer surface of the cover plate 31*j* for converging the outlet air.

The metal barrier net 3111 can prevent hair or debris from being sucked into the first fan shell, thereby avoiding damage to the fan assembly and reducing the fan's blowing wind force. The air gathering rings 3131 can gather the air blown towards the neck, thereby improving the blowing performance.

The first main body portion 101 further includes at least one air guiding vane 101*h*, and at least one air guiding vane 101*h* is arranged within the first air guide path 12 adjacent to the first fan assembly 3, and is configured to guide the wind from the first fan assembly 3.

In this embodiment, the number of air guiding vanes 101*h* is two. The two air guiding vanes 101*h* are respectively arranged on two sides of the first air guide path 12. Moreover, a distance between the two air guiding vanes 101*h* gradually increases along an air outlet direction of the first air guide path 12.

In this embodiment, a first conductive through hole 152 is provided in an inner side of the hanging main body adjacent to the first accommodating chamber 15. The first conductive through hole 152 is configured to allow a wire of the first fan assembly 3 to pass through to be communicated with a first power supply assembly 8. Moreover, the mounting portion 310*b* can be provided with an opening 310*c*. The wire connected to the motor can pass through the opening 310*c* and then be connected to the first power supply assembly 8 via the first conductive through hole 152.

Through the above structure, when the neck fan needs to be assembled, the first outer cover 16 is first opened, and then the wire of the first fan assembly 3 is communicated with the first power supply assembly 8 in the first mounting chamber 1014 through the first conductive through hole 152. Then, the first outer cover 16 is closed. After the wire of the first fan assembly 3 is connected, the first fan shell 31 is assembled with the hanging main body 1 through the buckling between the connection buckles 315 and the connecting buckle slots 151, and finally a vertical blowing type neck fan that is conductive with the hanging main body 1 and easy to mount is obtained.

In this embodiment, a second accommodating chamber 17 is further inwards sunken in one side, opposite to the first accommodating chamber 15, of the lower end portion of the second main body portion 102 of the hanging main body. The neck fan further includes a second fan assembly 5. The second fan assembly 5 includes a straight-tube-shaped second fan shell 51. The second fan shell 51 is detachably connected to the hanging main body and is located in the second accommodating chamber 17. The second fan shell 51 is provided with a fourth air inlet 511 and a fourth air outlet 513. The second fan assembly 5 is configured to drive an air flow to be blown from the fourth air inlet 511 towards the inner end portion via the fourth air outlet 513. Through the above structure, similarly, due to the straight-tube shape of the second fan shell 51, the neck fan is formed into a vertical blowing type fan capable of blowing air in a vertical direction. The second fan assembly 5 can drive the air flow to be blown from the fourth air inlet 511 towards the inner end portion 11 via the fourth air outlet 513, greatly improving the air-blowing efficiency. A user can directly feel the cool air blown to the neck when using the neck fan, thereby improving the overall performance of the fan. Furthermore, the second fan shell 51 is detachably connected and assembled with the hanging main body 1, so that separate mold-opening, machining, and assembling can be achieved during production. The production efficiency is improved, the production cost is reduced, it is also convenient for storage and transportation, and the portability of the product is improved.

In this embodiment, a plurality of connection buckle slots 151 are provided in an inner side of the second main body portion 102 of the hanging main body adjacent to the second accommodating chamber 17; the plurality of connection buckles 315 matched and clamped with the connection buckle slots 151 are arranged on an outer wall of the second fan shell 51; and the second fan shell 51 is in detachably buckled connection to the hanging main body 1. Specifically, the connection buckle slots 151 are symmetrically distributed on an inner side of the second main body portion 102 of the hanging main body. There are six groups of connection buckle slots 151. Each group includes two connection buckle slots 151. The connection buckles 315 are symmetrically located on the outer wall of the second fan shell 51. There are six groups of connection buckles 315, and each group includes two connection buckles 315.

In this embodiment, a second outer cover 18 is detachably connected to the second main body portion 102 of the hanging main body on an outer side away from the second accommodating chamber 17. As in Embodiment I, the second main body portion 102 of the hanging main body 1 is provided with a second mounting chamber 1024, and the second power supply assembly 9 is located inside the second mounting chamber 1024. The second mounting chamber 1024 has an opening, and the second outer cover 18 is detachably covered at the opening.

Further, the specific structure of the second fan assembly 5 can be identical to the first fan assembly 3. The second fan assembly 5 further includes a second motor 52 and a second fan blade 53 mounted on a rotating shaft of the second motor. The second fan shell 51 can be structurally similar to the first fan shell 31. For example, it can include a shell main body 31*a*, an air inlet cover 31*b*, a metal barrier net 3111 and an air outlet hood 31*c*. The fourth air inlet 511 can also include a plurality of air inlet holes 311*a* arranged on the metal barrier net 3111 of the second fan shell 51. The fourth air outlet can also include a plurality of air outlet holes 3130 arranged on the air outlet hood 31*c* of the second fan shell 51. The specific structure of the second main body portion 102 can be the same as that of the first main body portion 101, and the second main body portion 102 and the first main body portion 101 can be arranged symmetrically. The second fan assembly 5 and the first fan assembly 3 can also be arranged symmetrically. Therefore, the specific structures of the second fan shell 51 and the second main body portion 102 will not be introduced repeatedly here.

In this embodiment, a second conductive through hole 171 is provided in an inner side of the hanging main body adjacent to the second accommodating chamber 17. The second conductive through hole 171 allows a wire of the second fan assembly 5 to pass through to be communicated with the second power supply assembly 9.

Through the above structure, after the assembling of the first fan shell 31 is completed, the second fan shell 51 is installed in the same manner. The second outer cover 18 is first opened, and then the wire of the second fan assembly 5 is communicated with the second power supply assembly 9 in the second mounting chamber 1024 through the second conductive through hole 171. Then, the second outer cover 18 is closed. After the wire of the second fan assembly 5 is connected, the second fan shell 51 is assembled with the hanging main body 1 through the buckling between the connection buckles 315 and the connecting buckle slots 151, and finally a vertical blowing type neck fan that is conductive with the hanging main body 1 and easy to mount is obtained.

It can be understood that the inner sides of the first outer cover 16 and the second outer cover 18 are provided with at least one first snap-fit member 160, and the outer sides of the first main body portion 101 and the second main body portion 102 are provided with at least one second snap-fit member 1010. The first snap-fit member 160 and the second snap-fit member 1010 are snap-fitted to enable the assembly of the first outer cover 16 and the first main body portion 101 as well as the assembly of the second outer cover 18 and the second main body portion 102. Specifically, the number of the first snap-fit member 160 and the second snap-fit member 1010 can be multiple, such as 160a, 160b, 160c, 160d and 101a, 101b, 101c, 101d. Moreover, the structures of the multiple first snap-fit members 160a, 160b, 160c, 160d can be different, and the multiple second snap-fit members 101a, 101b, 101c, 101d are of the structures that match and cooperate with the multiple first snap-fit members.

It can be understood that both the first fan assembly 3 and the second fan assembly 5 are vertical blowing type fan assemblies with the air inlet and the air outlet on the same axis. In the first fan assembly 3, the air inlet cover 31b, the first fan blade 33, the first motor 32, the shell main body 31a and the air outlet hood 31c are all arranged in a straight line. In the second fan assembly 5, the air inlet cover 31b, the second fan blade 53, the second motor 52, the shell main body 31a and the air outlet hood 31c are all arranged in a straight line. In this way, the first fan assembly 3 and the second fan assembly 5 can generate relatively strong wind and achieve a better air outlet effect.

Furthermore, according to Embodiment I and Embodiment II, it can be seen that the fan main body and the other fan main body can be respectively provided with corresponding and independent key switches 1015 and 1025, so that the turning on and off of the fan main body and the other fan main body can be independently controlled by the corresponding key switches 1015 and 1025.

Figure 27:
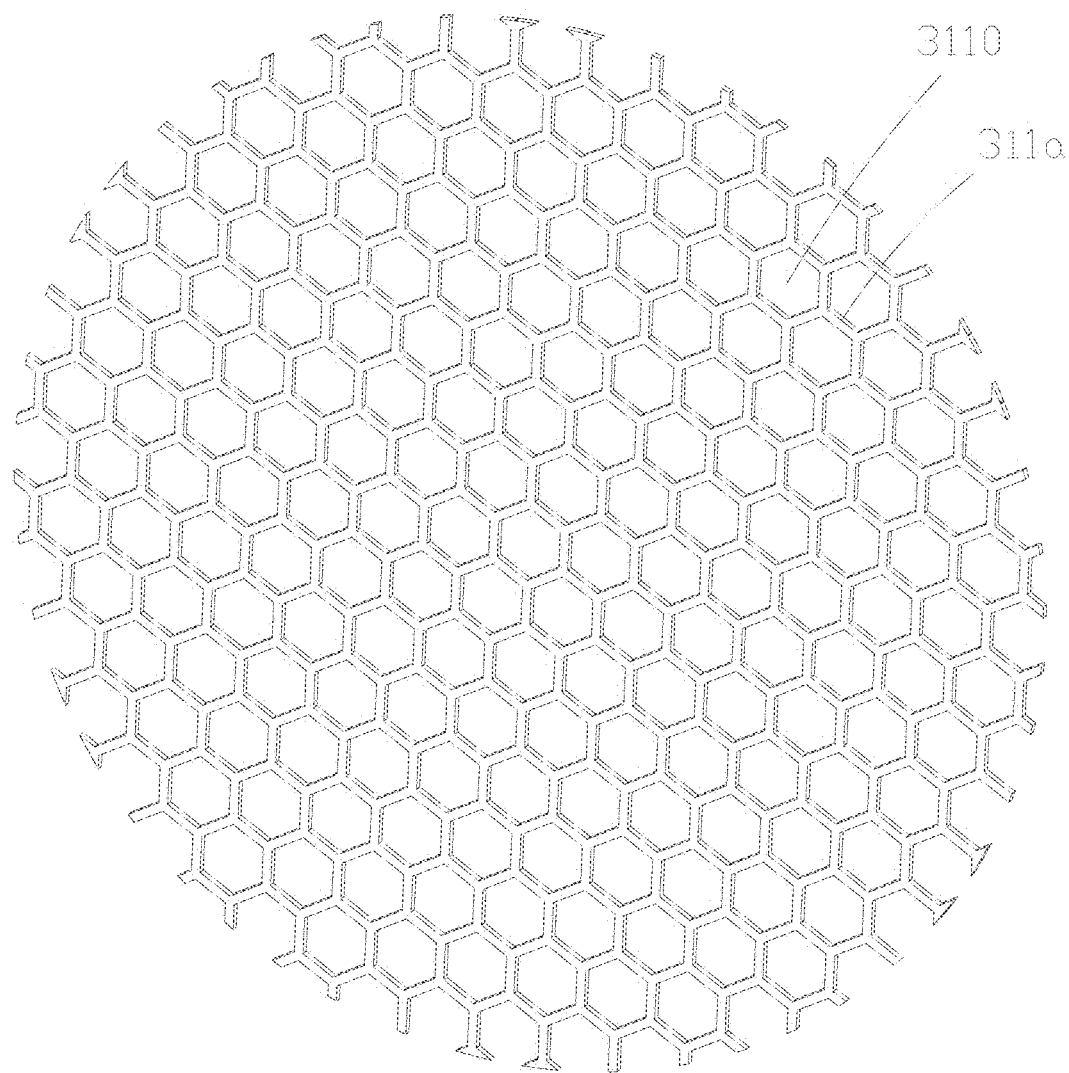
FIG. 27 is a schematic structural diagram of a metal screen of a first fan assembly of the fan main body according to a modified embodiment of Embodiment III of the present invention.

Furthermore, referring to FIG. 27, in a modified embodiment of Embodiment III, the air inlet holes 3110 of the metal barrier net 311 can also be in a regular hexagon. The plurality of air inlet holes 3110 are arranged in a honeycomb shape, and a surrounding wall 311a is arranged between two adjacent air inlet holes 3110. Such a design can make the air inlet area of the metal barrier net 311 the largest, minimize its weight, wind resistance, and maximize its air inlet volume. Specifically, the width of the surrounding wall ranges from 0.05 mm to 2 mm.

One or more implementation modes are provided above in combination with specific contents, and it is not deemed that the specific implementation of the present invention is limited to these specifications. Any technical deductions or replacements approximate or similar to the method and structure of the present invention or made under the concept of the present invention shall fall within the scope of protection of the present invention.

What is claimed is:

1. A neck fan, comprising:
    a first fan main body, wherein the first fan main body comprises an arc-shaped first main body portion, and a first air guide path positioned on an inner side of the first main body portion and extended along an extending direction of the first main body portion;
    a second fan main body connected to the first fan main body, wherein the second fan main body comprises an arc-shaped second main body portion, and a second air guide path positioned on an inner side of the second main body portion and extended along an extending direction of the second main body portion; and
    a flexible connection portion;
    wherein the first fan main body and the second fan main body are configured to blow air towards a user respectively, the first main body and the second fan main body are respectively provided with a control switch, and the control switch is configured to control an operation of the first fan main body and/or the second fan main body;
    wherein the flexible connection portion is provided with at least one installation hole, the at least one installation hole is configured to be sleeved and fixed on one end of the first fan main body and one end of the second fan main body, so that the first fan main body and the second fan main body are connected through the flexible connection portion, and the flexible connection portion further comprises at least one neck support portion, the at least one neck support portion is connected to an inner side of the flexible connection portion adjacent to a user's neck, and protrudes from each of the first main body portion, the first air guide path, the second main body portion and the second air guide path, and at least one air inlet gap is formed between the at least one neck support portion and the first fan main body or the second fan main body.

2. The neck fan according to claim 1, wherein the second fan main body and the first fan main body are oppositely arranged and are respectively positioned on two sides of the user's neck; and the second fan main body and the first fan main body are the same.

3. The neck fan according to claim 1, wherein the first fan main body further comprises a first fan assembly, and a first power supply assembly, and the control switch comprises a first switch, the first main body portion is provided with a first mounting cavity, the first power supply assembly is arranged within the first mounting cavity and is electrically connected to the first fan assembly, the first power supply assembly comprises a first battery and a first circuit board, the first switch and the first battery are electrically connected to the first circuit board, the first circuit board is provided with a first main control module, the first switch is mounted on the first main body portion and is electrically connected to the first main control module, and the first switch is configured to turn on or turn off the first fan assembly.

4. The neck fan according to claim 3, wherein the first fan main body further comprises a first charging interface and a first charging control module, and the first charging interface and the first charging control module are configured to charge the first battery; the first fan main body further comprises a first status indication module, and the first status indication module is configured to display at least one of a startup status, a shutdown status, a charging status, and an output wind level of the first fan main body or the neck fan.

5. The neck fan according to claim 3, wherein the first fan main body further comprises a first battery protection module, the first battery protection module is electrically connected to the first main control module and the first charging control module, and is configured to perform charging protection for the first battery.

6. The neck fan according to claim 3, wherein the first switch comprises a stepless adjustment key configured to perform stepless adjustment and control rotation speed of the first fan assembly; and the stepless adjustment key is a potentiometer with variable electric resistance or an encoder, and wherein the stepless adjustment key comprises a plurality of connection terminals and at least one adjustment pin, one of the plurality of connection terminals is grounded, and at least one adjustment pin is configured for the user to operate so that the other connection terminals output corresponding stepless adjustment signals.

7. The neck fan according to claim 3, wherein the first fan main body further comprises a first boost module; the first switch is configured to send out a first fan working signal; the first main control module, when receiving the first fan working signal, is configured to drive the first boost module to receive and boost the output voltage of the first battery, thereby driving the first fan assembly to operate; and the first main control module is also configured to control the output voltage of the first boost module to achieve control over the rotation speed of the first fan assembly.

8. The neck fan according to claim 7, wherein the first boost module comprises an inductor and a switching element, a control terminal of a MCU of the first main control module is connected to a control terminal of the switching element, a first conducting terminal of the switching element is connected to the first battery via the inductor, a second conducting terminal of the switching element is grounded, the first conducting terminal of the switching element is connected to the first fan assembly, the MCU of the first main control module controls the on-off state of the switching element, thereby controlling the voltage from the first battery to be boosted through the inductor, and provides the boosted voltage to the first fan assembly to drive the first fan assembly to blow air.

9. The neck fan according to claim 7, wherein the second fan main body further comprises a second fan assembly, and a second power supply assembly, and the control switch further comprises a second switch, the second power supply assembly comprises a second battery and a second circuit board, the second switch and the second battery are electrically connected to the second circuit board, the second circuit board is provided with a second main control module, the second switch is mounted on the second main body portion and is electrically connected to the second main control module, the second switch is configured to turn on or turn off the second fan assembly, the second fan main body further comprises a second boost module, the second switch is configured to send out a second fan working signal, the second main control module, when receiving the second fan working signal, is configured to drive the second boost module to receive and boost the output voltage of the second battery, thereby driving the second fan assembly to operate, and the second main control module is also configured to control the output voltage of the second boost module to achieve control over the rotation speed of the second fan assembly.

10. The neck fan according to claim 9, wherein the first main body portion is provided with a first conductive end, the second main body portion is provided with a second conductive end, when the first fan main body and the second fan main body are connected together, consequently, the first conductive end is communicated with the second conductive end, the first switch is electrically connected to the first main control module and the second main control module respectively, and the second switch is also electrically connected to the first main control module and the second main control module respectively, such that at least one of the first switch and the second switch can send out a third fan working signal; the first main control module is configured to receive the third fan working signal and drive the first boost module to boost the output voltage of the first battery, thereby driving the first fan assembly to operate, and the second main control module is configured to receive the third fan working signal and drive the second boost module to boost the output voltage of the second battery, thereby driving the second fan assembly to operate.

11. The neck fan according to claim 1, wherein the first fan main body and the second fan main body are manufactured independently and then detachably connected, so that the first fan main body and the second fan main body are able to operate and be used independently.

12. The neck fan according to claim 11, wherein an inner sidewall of the at least one installation hole is provided with a first anti-detachment structure and a second anti-detachment structure, the first anti-detachment structure is configured to engage with a first buckle on an outer surface of one end of the first fan main body, the second anti-detachment structure is configured to engage with a second buckle on one end of the second fan main body, and at least one of the first anti-detachment structure and the first buckle is provided with a plurality of concave-convex structures arranged in sequence along an extending direction of the connection member.

13. The neck fan according to claim 12, wherein the first anti-detachment structure comprises a plurality of first buckle slots arranged along an extending direction of the connection member, the plurality of first buckle slots are configured to engage with a plurality of protrusions arranged along an extending direction of the first buckle; the second anti-detachment structure comprises a plurality of second buckle slots arranged along the extending direction, the plurality of second buckle slots are configured to engage with a plurality of protrusions arranged along an extending direction of the second buckle; the first anti-detachment structure is configured to be detachably connected with the first buckle, and the second anti-detachment structure is configured to be detachably connected with the second buckle; the flexible connection portion is also provided with a first fixing structure and a second fixing structure, the first fixing structure and the second fixing structure are respectively arranged at two ends of the flexible connection portion, the first fixing structure is configured to connect with a third fixing structure at one end of the first fan main body, and the second fixing structure is configured to connect with a fourth fixing structure at one end of the second fan main body; the first fixing structure is configured to be detachably connected with the third fixing structure, and the second fixing structure is configured to be detachably connected with the fourth fixing structure.

14. The neck fan according to claim 3, wherein the first fan assembly is arranged at one end of the first main body portion and is configured to blow air towards the first air guide path, and the first air guide path is configured to guide air of the first fan assembly to one side of the first main body portion and one end of the first main body portion away from the first fan assembly.

15. The neck fan according to claim 14, wherein the first fan assembly comprises a first fan shell, a first motor, and a first fan blade mounted on a rotating shaft of the first motor, the first motor and the first fan blade are arranged within the first fan shell; the first fan shell comprises a shell main body and an air outlet hood, the air outlet hood is arranged on one side of the shell main body; the air outlet hood comprises a plurality of air gathering rings and an annular wall structure connected to a periphery of the plurality of air gathering rings, a plurality of air outlet holes are formed among the plurality of air gathering rings, and the air gathering rings are configured to cooperate with an inner side surface of the annular wall structure to pressurize wind from the shell main body and then blow it out.

16. The neck fan according to claim 15, wherein the inner side surface of the annular wall structure is an inclined surface or an arc-shaped surface, so that an inner diameter of the annular wall structure gradually decreases along a direction from the shell main body to the air outlet hood; the shell main body comprises an annularly arranged sidewall structure, an mounting portion positioned at one end inside the sidewall structure and an air guiding portion connected between the mounting portion and the sidewall structure, the air guiding portion comprises a plurality of air guiding blades arranged at intervals and is configured to guide wind from the first fan blade based on a preset direction, the first fan blade and the first motor are arranged within the sidewall structure and are positioned on one side of the mounting portion, and the first motor is mounted on the mounting portion; the first fan shell further comprises a metal barrier net, the metal barrier net is arranged on one side of the sidewall structure away from the air outlet hood, the metal barrier net is made of metal material and is provided with a plurality of air inlet holes, and an inner diameter of each air inlet holes ranges from 0.5 mm to 4 mm; the air inlet hole is in a regular hexagon shape, a surrounding wall is arranged between two adjacent air inlet holes, and a width of the surrounding wall ranges from 0.05 mm to 2 mm.

17. A neck fan, comprising:
a first fan main body, wherein the first fan main body comprises an arc-shaped first main body portion, and a first air guide path positioned on an inner side of the first main body portion and extended along an extending direction of the first main body portion;
a second fan main body connected to the first fan main body, wherein the second fan main body comprises an arc-shaped second main body portion, and a second air guide path positioned on an inner side of the second main body portion and extended along an extending direction of the second main body portion; and
a connection portion, wherein the connection portion is provided with at least one installation hole, the at least one installation hole is configured to be sleeved and fixed on one end of the first fan main body and one end of the second fan main body, so that the first fan main body and the second fan main body are connected through the connection portion;
wherein the first main body portion comprises a first outer shell and a first inner shell detachably connected to first outer shell, the first air guide path is arranged in the first inner shell, and a first air blowing opening is formed at one end of the first inner shell; the second main body portion comprises a second outer shell and a second inner shell detachably connected to second outer shell, the second air guide path is arranged in the second inner shell, and a second air blowing opening is formed at one end of the second inner shell, wherein part of air flow is discharged from first air blowing opening and the second blowing opening, and part of air flow blows towards the connection portion along the first air guide path and the second air guide path.

18. A neck fan, comprising:
a first fan main body, wherein the first fan main body comprises an arc-shaped first main body portion, and an arc-shaped first air guide path positioned on an inner side of the first main body portion and extended along an extending direction of the first main body portion;
a second fan main body connected to the first fan main body and the second fan main body are manufactured independently and then detachably connected, and the second fan main body comprises an arc-shaped second main body portion, and an arc-shaped second air guide path positioned on an inner side of the second main body portion and extended along an extending direction of the second main body portion; and
wherein the first fan main body further comprises a first fan assembly, the first fan assembly comprises a first fan shell, a first motor, and a first fan blade mounted on a rotating shaft of the first motor, the first motor and the first fan blade are arranged within the first fan shell, the first fan assembly is arranged at one end of the first main body portion and is configured to blow air towards the first air guide path, and the first air guide path is configured to guide air of the first fan assembly to one side of the first main body portion and one end of the first main body portion away from the first fan assembly;
wherein the second fan main body further comprises a second fan assembly, the second fan assembly comprises a second fan shell, a second motor, and a second fan blade mounted on a rotating shaft of the second motor, the second motor and the second fan blade are arranged within the second fan shell, the second fan assembly is arranged at one end of the second main body portion and is configured to blow air towards the second air guide path, and the second air guide path is configured to guide air of the second fan assembly to one side of the second main body portion and one end of the second main body portion away from the second fan assembly; and
wherein a plurality of first connection buckle slots are provided in an inner side of the first main body portion, a plurality of first connection buckles matched with the first connection buckle slots are arranged on an outer wall of the first fan shell, thereby the first fan shell is in detachably buckled connection to the first main body portion by the first connection buckles; and a plurality of second connection buckle slots are provided in an inner side of the second main body portion, a plurality of second connection buckles matched with the second connection buckle slots are arranged on an outer wall of the second fan shell, thereby the second fan shell is in detachably buckled connection to the second main body portion by the second connection buckles.

19. The neck fan according to claim 18, wherein each of the first fan shell and the second fan shell comprises a shell main body and an air outlet hood, the air outlet hood is arranged on one side of the shell main body; the sir outlet hood comprises a plurality of air gathering rings and an annular wall structure connected to a periphery of the plurality of air gatherings rings, a plurality of air outlet holes are formed among the plurality of air gathering rings, and the air gathering rings are configured to cooperate with an inner side surface of the annular wall structure to pressurize air from the shell main body and then blow it out.

* * * * *